US007228496B2

(12) United States Patent
Hamada

(10) Patent No.: US 7,228,496 B2
(45) Date of Patent: Jun. 5, 2007

(54) DOCUMENT EDITING METHOD, DOCUMENT EDITING SYSTEM, SERVER APPARATUS, AND DOCUMENT EDITING PROGRAM

(75) Inventor: Shinichiro Hamada, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 372 days.

(21) Appl. No.: 10/614,315

(22) Filed: Jul. 8, 2003

(65) Prior Publication Data
US 2004/0010755 A1 Jan. 15, 2004

(30) Foreign Application Priority Data
Jul. 9, 2002 (JP) ............................. 2002-200284
Jul. 9, 2002 (JP) ............................. 2002-200285

(51) Int. Cl.
*G06F 17/00* (2006.01)

(52) U.S. Cl. ...................... 715/513; 715/530; 715/523; 715/788; 709/203; 707/100

(58) Field of Classification Search ............... 715/513, 715/530, 788, 522, 523; 709/207, 203; 707/100; 719/311
See application file for complete search history.

(56) References Cited

U.S. PATENT DOCUMENTS

| | | | | |
|---|---|---|---|---|
| 5,537,628 A | * | 7/1996 | Luebbert | 715/522 |
| 5,649,218 A | * | 7/1997 | Saito | 715/513 |
| 5,669,005 A | * | 9/1997 | Curbow et al. | 715/523 |
| 5,895,454 A | * | 4/1999 | Harrington | 705/26 |
| 5,991,782 A | * | 11/1999 | Miyagawa et al. | 715/513 |
| 6,026,433 A | * | 2/2000 | D'Arlach et al. | 709/217 |
| 6,029,182 A | * | 2/2000 | Nehab et al. | 715/523 |
| 6,182,092 B1 | * | 1/2001 | Francis et al. | 715/513 |
| 6,256,623 B1 | * | 7/2001 | Jones | 707/3 |
| 6,263,352 B1 | * | 7/2001 | Cohen | 715/513 |

(Continued)

FOREIGN PATENT DOCUMENTS

JP 3-282495 12/1991

(Continued)

OTHER PUBLICATIONS

Spinks, R. et al., "Document Clipping with Annotation", Apr. 1, 2001, IBM Developerworks, downloaded from <http://www-128.ibm.com/developerworks/ibm/library/ibm-clip/>, 12 pages.*

(Continued)

*Primary Examiner*—Heather R. Herndon
*Assistant Examiner*—James H. Blackwell
(74) *Attorney, Agent, or Firm*—Oblon, Spivak, McClelland, Maier & Neustadt, P.C.

(57) ABSTRACT

A partial document defined in advance as an operating unit composed of at least one element, which is coincident with or is contained in a structural document, includes at least information representing that the partial document is an operating unit. Based on this information, at least the partial document and parts data by parts data containing position information on the partial document are created. Structured documents are stored in storage means as a set of parts data. The stored structured document is edited by updating parts data corresponding to the partial document targeted for operation, according to the contents of operation for the partial document selected as an operating target.

32 Claims, 17 Drawing Sheets

U.S. PATENT DOCUMENTS

| | | | |
|---|---|---|---|
| 6,278,448 B1* | 8/2001 | Brown et al. | 715/866 |
| 6,295,530 B1* | 9/2001 | Ritchie et al. | 707/4 |
| 6,327,628 B1* | 12/2001 | Anuff et al. | 719/311 |
| 6,366,923 B1* | 4/2002 | Lenk et al. | 707/104.1 |
| 6,397,231 B1* | 5/2002 | Salisbury et al. | 715/515 |
| 6,453,320 B1* | 9/2002 | Kukura et al. | 707/103 R |
| 6,499,052 B1* | 12/2002 | Hoang et al. | 709/203 |
| 6,507,410 B1* | 1/2003 | Robertson et al. | 358/1.18 |
| 6,535,896 B2* | 3/2003 | Britton et al. | 715/523 |
| 6,611,843 B1* | 8/2003 | Jacobs | 707/102 |
| 6,633,887 B2* | 10/2003 | Suzuki et al. | 707/102 |
| 6,643,661 B2* | 11/2003 | Polizzi et al. | 707/100 |
| 6,668,353 B1* | 12/2003 | Yurkovic | 715/501.1 |
| 6,697,825 B1* | 2/2004 | Underwood et al. | 715/530 |
| 6,715,129 B1* | 3/2004 | Hind et al. | 715/513 |
| 6,725,425 B1* | 4/2004 | Rajan et al. | 715/513 |
| 6,763,040 B1* | 7/2004 | Hite et al. | 370/522 |
| 6,763,388 B1* | 7/2004 | Tsimelzon | 709/228 |
| 6,772,146 B2* | 8/2004 | Khemlani et al. | 705/36 R |
| 6,779,042 B1* | 8/2004 | Kloba et al. | 709/248 |
| 6,826,597 B1* | 11/2004 | Lonnroth et al. | 709/207 |
| 6,832,263 B2* | 12/2004 | Polizzi et al. | 709/246 |
| 6,832,355 B1* | 12/2004 | Duperrouzel et al. | 715/788 |
| 6,859,212 B2* | 2/2005 | Kumar et al. | 715/744 |
| 6,865,593 B1* | 3/2005 | Reshef et al. | 709/203 |
| 6,976,210 B1* | 12/2005 | Silva et al. | 715/513 |
| 7,103,838 B1* | 9/2006 | Krishnamurthy et al. | 715/530 |
| 2001/0028369 A1* | 10/2001 | Gallo et al. | 345/848 |
| 2001/0043235 A1* | 11/2001 | Best et al. | 345/781 |
| 2002/0012010 A1* | 1/2002 | Pasquali | 345/719 |
| 2002/0024536 A1* | 2/2002 | Kahan et al. | 345/745 |
| 2002/0069222 A1* | 6/2002 | McNeely | 707/513 |
| 2002/0078105 A1* | 6/2002 | Hamada et al. | 707/530 |
| 2002/0091688 A1* | 7/2002 | Decary et al. | 707/6 |
| 2002/0103818 A1* | 8/2002 | Amberden | 707/205 |
| 2002/0158899 A1* | 10/2002 | Raymond | 345/736 |
| 2002/0194267 A1* | 12/2002 | Flesner et al. | 709/203 |
| 2002/0196273 A1* | 12/2002 | Krause | 345/738 |
| 2003/0088829 A1* | 5/2003 | Itani | 715/513 |
| 2003/0101412 A1* | 5/2003 | Eid | 715/513 |
| 2003/0159110 A1* | 8/2003 | Numata et al. | 715/513 |
| 2004/0123238 A1* | 6/2004 | Hefetz et al. | 715/513 |
| 2004/0143795 A1* | 7/2004 | Matsuishi | 715/530 |
| 2004/0230917 A1* | 11/2004 | Bales et al. | 715/854 |

FOREIGN PATENT DOCUMENTS

| | | |
|---|---|---|
| JP | 4-373015 | 12/1992 |
| JP | 7-44559 | 2/1995 |
| JP | 7-336659 | 12/1995 |
| JP | 10-40247 | 2/1998 |
| JP | 2000-348061 | 12/2000 |
| JP | 2001-51771 | 2/2001 |
| JP | 2001-109742 | 4/2001 |
| JP | 2002-526824 | 8/2002 |

OTHER PUBLICATIONS

Hori M. et al., "Robustness of External Annotation for Web-Page Clipping: Empirical Evaluation with Evolving Real-Life Web Documents", 2000, ACM, 8 pages.*

Yang, S. et al., "A Content Provider-Specified Web Clipping Approach for Mobile Content Adaptation", 2002, Springer-Verlag, pp. 324-328.*

U.S. Appl. No. 09/627,299, filed Jul. 27, 2000, Hamada et al.
U.S. Appl. No. 09/962,149, filed Sep. 26, 2001, Hamada et al.
U.S. Appl. No. 10/015,604, filed Dec. 17, 2001, Hamada et al.

* cited by examiner

DOCUMENT EDITING METHOD, DOCUMENT EDITING SYSTEM, SERVER APPARATUS, AND DOCUMENT EDITING PROGRAM

CROSS-REFERENCE TO RELATED APPLICATIONS

This application is based upon and claims the benefit of priority from the prior Japanese Patent Applications No. 2002-200284, filed Jul. 9, 2002; and No. 2002-200285, filed Jul. 9, 2002, the entire contents of both of which are incorporated herein by reference.

BACKGROUND OF THE INVENTION

1. Field of the Invention

The present invention relates to a method and apparatus for editing a structured document such as an XML document or an HTML document.

2. Description of the Related Art

In a WWW (World Wide Web), a shopping site has a page for listing product catalogues, and a news site has a page for listing news articles. In addition, many of portal sites describes information on different categories such as stock price information, weather forecast information or headline news in combination in a partial page area called a portlet in a top page. Here, this information on category by category basis is called sub-contents. Recently, on a Web page capable of being browsed via Internet, unlike a conventional document-like Web page, the sub-contents contained inside are highly independent of each other, and Web pages configured in an aggregate manner increase.

With respect to such a Web page, there is a user's demand to selectively browse only sub-contents of interest instead of reading all the pages in order. Apart from only browsing, for example, there are other demands listed below.
1) Comparison or sorting in units of sub-contents;
2) Classification or arranging in units of sub-contents; and
3) Acquisition or storing in units of sub-contents.

However, the current browser does not have functions which can correspond to the above demands.

BRIEF SUMMARY OF THE INVENTION

It is an object of the present invention to provide a document editing method, a document editing system, a server apparatus, and a document editing program which enable browsing not in units of Web pages but in units of sub-contents contained in each Web page, and collecting only a desired sub-content from one Web page or each of a plurality of different Web pages, thereby enabling editing in units of sub-contents.

According to a first aspect of the present invention, a document editing method comprises: displaying on a display unit a structured document having a document structure composed of a plurality of elements; editing the displayed structured document based on a partial document defined as an operating unit in advance composed of at least one of the elements which is coincident with or is included in the displayed structured document; creating parts data by the partial document which includes at least partial document and position information on the document structure of the partial document based on information contained in the partial document, the information representing that the partial document is the operating unit, and storing the structured document in a storage unit as a set of the parts data; and editing the structured document by updating the parts data corresponding to the partial document which is not targeted for operation according to the contents of operation relevant to the partial document selected as an operating target.

According to a second aspect of the present invention, a server apparatus comprises: a unit configured to display on display means a structured document having a document structure composed of a plurality of elements; and a unit configured to distribute the structured document to a client unit which edits the displayed structured document based on a partial document defined in advance as an operating unit composed of at least one of the elements, the partial document being coincident with or being contained in the displayed structured documents, wherein the structured document to be distributed to the client unit includes information representing a partial document as the operating unit which is coincident with or is contained in at least the structured documents.

According to an aspect of the present invention, with respect to the respective partial documents which can recognized based on information which represents a partial document on operating units, which are contained in a structured document, the part data (page parts) are created based on such additional information, whereby the contents displayed on a screen can be easily operated to be edited in units of sub-contents (units of partial document) based on the page parts.

Therefore, as a structured document, for example, browsing not in units of Web pages but in units of sub-contents contained on each Web page is possible, for example. Moreover, only desired sub-contents are collected from one Web page or each of a plurality of different Web pages, and the acquired sub-contents can be edited in units of sub-contents.

According to a second aspect of the present invention, on a client side, as a structured document, for example, browsing not in units of Web pages but in units of sub-contents contained in each Web page is possible, for example. Moreover, there can be provided a Web page for fetching only desired sub-contents from one Web page or each of a plurality of Web pages, enabling comparison, sorting, classification/arranging, or storage in units of sub-contents.

DETAILED DESCRIPTION OF THE INVENTION

Figure 1:
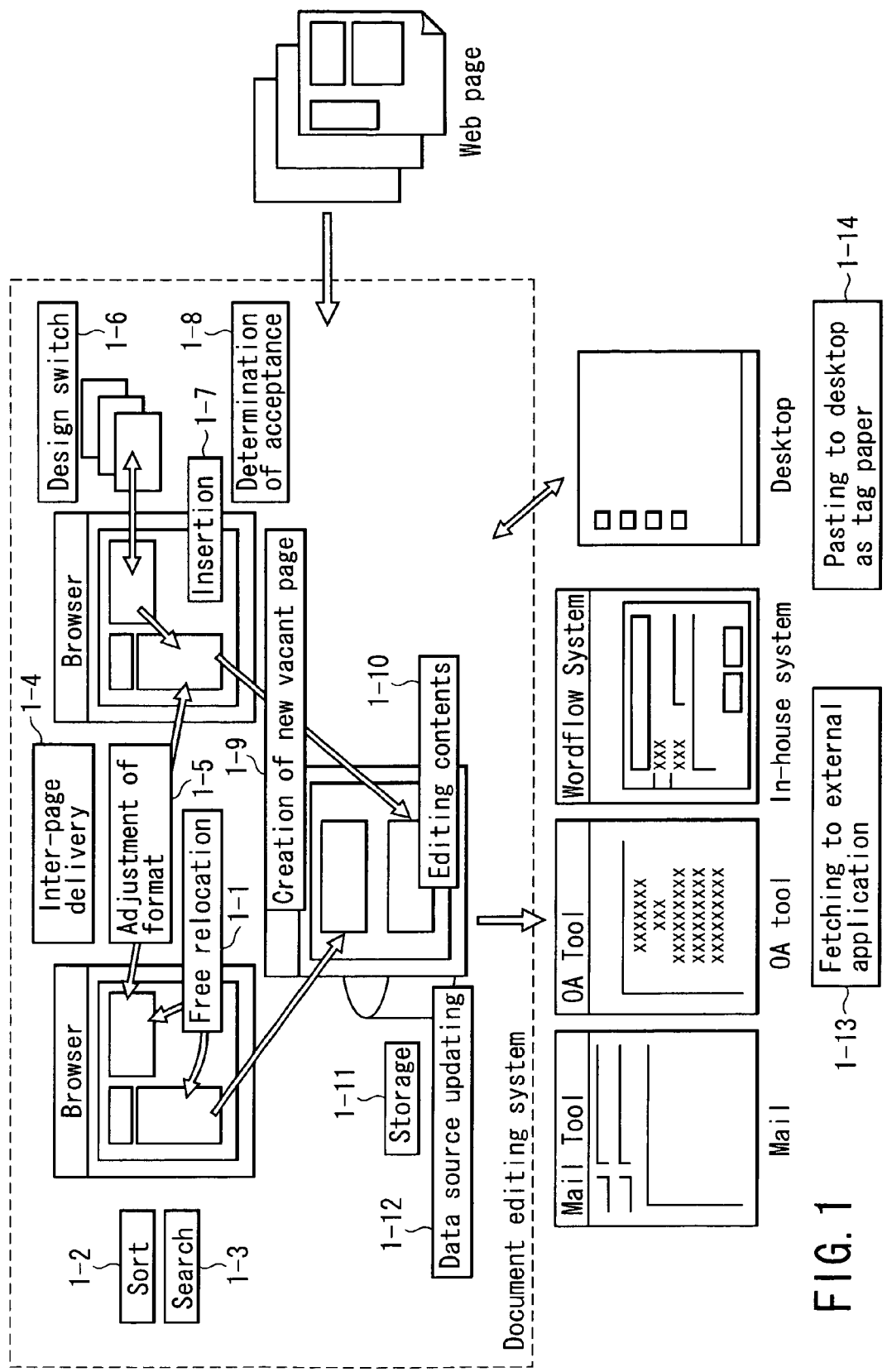
FIG. 1 is a view illustrating a function of a document editing system according to one embodiment of the present invention.

Hereinafter, one preferred embodiment of the present invention will be described with reference to the accompanying drawings.

First, terms used in the following embodiment will be described.

A Web document or a Web page is a structured document having a document structure composed of a plurality of elements described in HTML or XML which can be browsed via Internet. In the following document, although a description has been given by way of example of a Web document (called a Web page), it is not limited thereto. The present embodiment can be applied even to a general structured document such as an HTML document or an XML document which is created for the purpose of being browsed via Internet, and which is created for an arbitrary purpose by an arbitrary editor, and is acquired by arbitrary means even in a structured document acquired via Internet.

Sub-contents are display data which is an aggregate in view of contents on a displayed Web page, and which is highly independent of each other in view of their contents. How sub-contents are delimited is intended by an author of the Web page. The sub-contents correspond to partial documents which can be delimited in variety from a totally different viewpoint depending on the writers of the Web page so that the display data can be displayed by the partial document. Therefore, the sub-contents can be considered to be partial pages (partial documents) which a user on one Web page (a Web document) wants to handle independently. For example, many of portal sites describe information on different categories such as stock price information, weather forecast information or news articles in combination on a partial page area called portlet in a top page. For example, information on a category by category basis, that is, for example, each of news articles or weather forecast information may be one item of sub-contents (a partial document) or each item of news in news articles may be sub-contents (partial documents). The context or delimiting of the sub-contents is not limited in particular. A full text of one Web page coincides with one partial document, and such a partial document may contain a plurality of partial documents. In the following document, the sub-contents and partial documents may be regarded equivalently.

(General Description of Functions)

An outline of a document editing system according to the present embodiment will be described here. In the description, a generic name of general software having a Web display function is broadly called a browser. This is not limited to software which primarily focuses on a Web display function such as INTERNET EXPLORER (trademark) or NETSCAPE (trademark). For example, a document edition system according to the present embodiment is equipped with a data base having a Web document display function, and this is also called a browser.

1) A function for freely relocating sub-contents by a GUI operation such as drag & drop on a browser (corresponding to a need for comparison or sorting);

2) A function for posting sub-contents by a GUI operation such as drag & drop from one browser to another browser (corresponding to a need for classification or arranging); and 3) A function for opening a browser which displays a page on which sub-contents are not contained, and posting the sub-contents to be acquired from a variety of pages by a GUI operation such as drag & drop (corresponding to a need for acquisition or storage).

The above need from the user can be covered by this basic functional specification. With this basic function specification being a "nucleus", peripheral functions are added, and a complete functional specification has been designed.

FIG. 1 is a bird view of these functions. Hereinafter, a general description of functional specification will be given with reference to FIG. 1. FIG. 1 shows an example of functional flow provided to illustrate a use mode for clarity, where a configuration in actual system design is different from another, as described later. Thus, it should be noted that the figure is not a functional block diagram.

When a browser of this system reads a Web page on Internet, a file system or the like, this browser displays the Web page as in a conventional browser. In addition, this browser provides various operating functions for a user to conveniently handle sub-contents, that is, functions designated by reference numerals 1-1 to 1-14 of FIG. 1. Now, an outline of these functions 1-1 to 1-14 will be described here.

(Free Relocating Function 1-1)

One is a free relocating function of sub-contents on a browser. At a browser Web display portion, a user can move arbitrary sub-contents to another position by using a GUI operation such as drag & drop. There are two types of complete modes; a completely free mode in units of dots and a layout mode in which location is carried out along a frame. In this manner, for example, on a product listing page at a shopping site, there is an advantageous effect that a list of products can be changed in browsing according to the user's convenience.

(Sorting Function 1-2)

A sorting function is provided as a function associated with the above function. A sorting function 1-2 is initiated by selecting it from a menu, a tool button and the like. All the sub-contents contained in pages or the specified contents can be sorted according to the contents of a specific item. In this manner, for example, products at the shopping site can be rearranged by price or by type, and thus, there is an advantageous effect that the products can be easily compared with each other. In addition, this sorting function is used together with an inter-page posting function 1-4 in FIG. 1 described later, thereby making it possible to compare product items on a variety of Web sites or Web pages.

Conventionally, direct support by a machine cannot be received with respect to comparison of the contents at different Web sites, and the only one way has been to make visual check.

(Search Function 1-3)

A search function of sub-contents is also provided. The search function is initiated by selecting it from a menu, a tool button and the like. Two types of methods are provided. From among the pages, a search is made in accordance with a user input condition, and the result is established in a selective state in the same browser (a desired item is indicated to the user by focusing it). Alternatively, a browser is opened as another window by using a new vacant page creating function 1-9 in FIG. 1, the corresponding sub-contents are placed there. In addition, search and narrowing can be carried out sequentially by repeatedly using this search function.

(Inter-page Posting Function 1-4)

A function for posting sub-contents between Web pages displayed on different types of browser is provided as a next function. Sub-contents separately displayed at a plurality of Web sites or on Web pages can be seen on the same page. This function has the advantageous effect described previously. Further, this search function is used in combination with a new vacant page creating function 1-9 of FIG. 1, whereby only the sub-contents of interest can be collected on a new page, and further, can be compared with each other.

(Format Adjusting Function 1-5)

In addition, a format (type) adjusting function is provided as its auxiliary function. When sub-contents are posted between different Web pages, there is a case where types of such sub-contents are unacceptable. For example, there is a case where a display format or data format is different from another on a page by page basis with respect to product listing pages. Although it is possible to insert the format as is, it is inconvenient in the case where an attempt is made to compare sub-contents with each other by using sort 1-2 or the like altogether. A format (type) adjusting function 1-5 automatically solves this problem. When a system determines that the type of sub-contents does not match a page on the accepting side, the system searches a proper one from a database of a Web format conversion rule which the system has, and applies the conversion rule to insert the types in all.

(Design Switching 1-6)

As another function, a function for switching a design (called a display format or style) is provided. The design switching function is initiated by selecting it from a menu, a tool button and the like. The design switching function is provided as a method for switching a design to a single or a plurality of sub-contents with the contents being as they are. For example, with respect to product catalogs listed on Web, switching can be effected to a display format in which a data specification is understandable or to a display format in which a product design is understandable. However, this function is available for use only when the Web page is described by separating data and a style sheet (display method) as in XML or the like.

(Inserting Function 1-7)

A function for inserting sub-contents into the sub-contents is provided. By using this function, for example, a user can contain a product catalog in the existing product catalogs. This function is recursive, and can carry out infinitely processing for placing sub-contents in the existing sub-contents and inserting other sub-contents into the internal sub-contents.

(Acceptability Determining Function 1-8)

A sub-contents acceptability determining function 1-8 is automatically initiated when sub-contents are inserted into another place by the above described free relocating function 1-1 or inter-page pasting function 1-4, or a GUI operation such as drag & drop. With this function, when the inserting function is executed, the inserting function is canceled in the case where the Web page which is an accepting side or the inserting function 1-7 is utilized. In addition, the inserting function is canceled in the case the set condition for other sub-contents to accept such insertion is not met. An acceptance condition can be provided with respect to a format of sub-contents.

This function 1-8 is used together with the format adjusting function 1-5. If the sub-contents targeted for insertion does not meet the condition defined on the accepting side, an attempt is made to make conversion into an acceptance type by using the format adjusting function 1-5. If a method for making conversion into an acceptance type has been found, such a type is inserted. If not, the inserting processing is canceled.

(New Vacant Page Creating Function 1-9)

A new vacant page creating function 1-9 is initiated by selecting it from a menu, a tool button and the like. In execution, another browser window is opened, and a vacant Web page is newly created there. One important utilizing method is that, with this page being a scrap book, a user can acquire only sub-contents of interest from a plurality of Web pages by drag & drop and the like. This new page can inherit a Web page design of a browser which is an opening source. In this case, a new page is displayed on another window in a state in which all of the sub-contents only have been removed from the source Web pages.

(Contents Editing Function 1-10)

A contents editing function 1-10 is initiated by selecting it from a menu, a tool button and the like. When the function is initiated, an edit mode is displayed. Then, a user can edit the currently selected sub-contents on a browser or a dedicated editing software on another window.

An editing function includes an inline mode for changing each data field in an HTML format while a displayed design is kept unchanged and a complete mode for changing a design. Functions to be added to these modes include: a function for, when design and data are separated from each other as in XML or when a data field is changed, reflecting (rewriting) a value to an internal data portion; and a function for, when the data format is specified strictly by a schema or the like, providing an optimal input HTML form GUI along such a data format. These functions can be implemented by using the existing technique.

In addition, sub-contents can be newly created. This function utilizes a function in the inline mode. When this function is initiated, an HTML format is displayed in a format of immediately preceding sub-contents. When the user determines a value by filling it in each item, new sub-contents are added into that page.

(Storage Function 1-11)

A storage function 1-11 is initiated by selecting it from a menu, a tool button and the like. The user can edit a configuration or contents of a Web page by using the previously introduced function. By using the storage function 1-11, a changed state can be stored in a variety of storage systems. As a storage destination, a Web server, a database and the like in which the user's home page is placed can be selected as well as a file system of a local host which the user is using.

As a storage format, in addition to an HTML or an XML, a special format of this system having configuration information on these sub-contents added thereto can be selected. The special format stores any of the sub-contents whichever it is. Thus, when next reading is carried out, a function oriented to the sub-contents described previously can be continuously utilized.

(Data Source Updating Function 1-12)

As an auxiliary function, a data source updating function 1-12 is provided. This function is one type of storage function. When a Web page delivered from the Web server is edited, the update information can be transmitted to a source Web server. The received Web server causes proper storage such as a database to reflect the update data according to the system configuration.

(Function 1-13 for Fetching into External Application)

A function 1-13 for fetching sub-contents into an external application is a function for fetching only desired sub-contents from an arbitrary Web page (including a scrap book) opened on a browser by posting them to the application by a GUI operation such as drag & drop. As a fetching destination, a mail, an OA tool, an in-house work flow system or the like is exemplified as an example of application.

(Function 1-14 for Pasting into Desktop as Tag Paper)

A function 1-14 for pasting sub-contents into a desktop is provided as a function which conforms with the above function 1-13 for fetching into an external application. Desired sub-contents are dropped into the desktop from an arbitrary Web page (including a scrap book) opened on a browser, whereby the sub-contents can be pasted as tag paper (electronic tag). The sub-contents pasted to this tag paper can be dropped into an arbitrary page or an application later.

(System Configuration)

A configuration of a document editing system for implementing the above described functions will be described here.

In order to provide to a user the above described functions with sub-contents being in units of processes, it must be determined where at least in Web page falls into sub-contents. That is, sub-contents may be included in other sub-contents (having parent sub-contents) or other sub-contents are included (having child sub-contents) (this is called an inclusive relationship or a parent relationship between sub-contents (partial documents). Thus, information concerning an inclusive relationship between sub-contents is required. The information is called Web block structure information, or briefly block structure information. In addition, decomposing one Web page in units of sub-contents which are processing units of this system based on block structure information included therein is called blocking.

Also, such blocking is a feature of the present invention, and, of course, block structure information is not contained in a Web document such as an HTML document or an XML document currently widely used.

Now, a description will be given with respect to how the block structure information is acquired and handled. Here, the following policy is adopted in acquiring and handling block structure information.

1) A dedicated Web language described including block structure information is prepared (hereinafter, this language is called a block Web language, and a document written in this language is called a block Web document).

2) This system is provided to carry out processing based on the block Web language.

3) When the existing Web document such as HTML or XML is inputted to this system, the document is fetched after converted into the block Web language before carrying out the above processing. At this time, it is required to compensate for block structure information, and some functions are provided as a compensation method.

There are two reasons why the above policies were employed.

First, this dedicated block Web language having complete information is intended as a primary method for utilizing this system. When the block Web language is inputted, an author can describe where is provided as a block (contents to be independently handled) together with contents. Therefore, this block Web language is assumed to be widely disclosed in order to be used by the Web author.

As a system for providing an operating function for a user to handle sub-contents based on the block Web language, there is utilized a technique disclosed in U.S. application Ser. No. 09/627,299 filed on Jul. 27, 2000 (Title of the Invention: Web Page parts integrated processing method and apparatus; Inventors: Shinichiro Hamada and Toshibumi Seki).

On the other hand, it is an object of the present invention to flexibly cope with a generally known Web page description language. The Web languages known at the present stage are HTML and XML. There is employed a system for conversion into a previous block Web language instead of providing a processing module for directly handling these languages. By doing this, a system is simplified, and at the same time, only conversion processing can be made independent. Thus, there is an advantage that plug-in compatible expandability to a conversion system which will be required is obtained.

In conversion, since the HTML or XML itself does not have block structure information, insufficient information must be compensated for. In contrast, there are a method for assignment from another document which has been prepared in advance; a method for a user to specify the information on the spot when a browser is used; and a so called text mining method for mechanically estimating a block structure from the contents of a document. In the following description, there is shown a case of implementation by using the previous two methods. Although a third method can be implemented by using the existing technique, only possibility is presented here.

Figure 2:
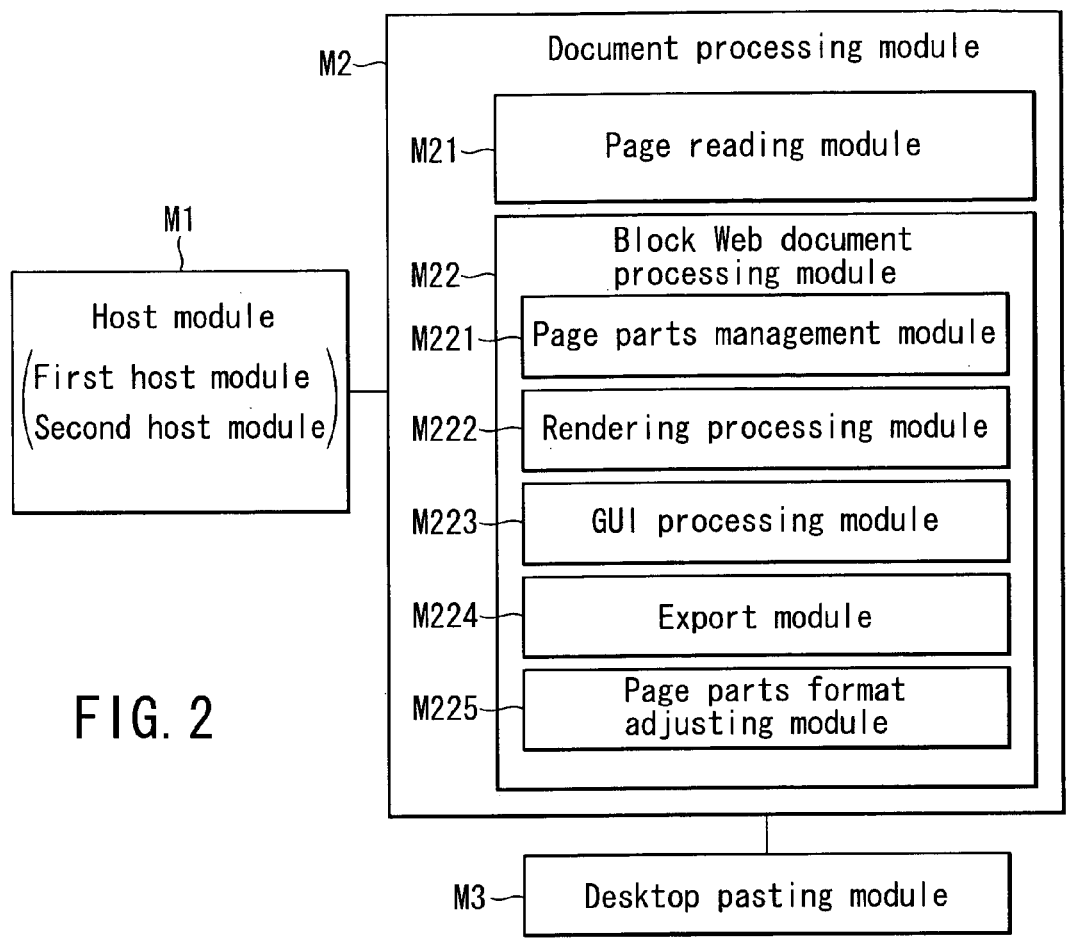
FIG. 2 is a diagram showing an example of functional configuration of the document editing system.
Figure 4:
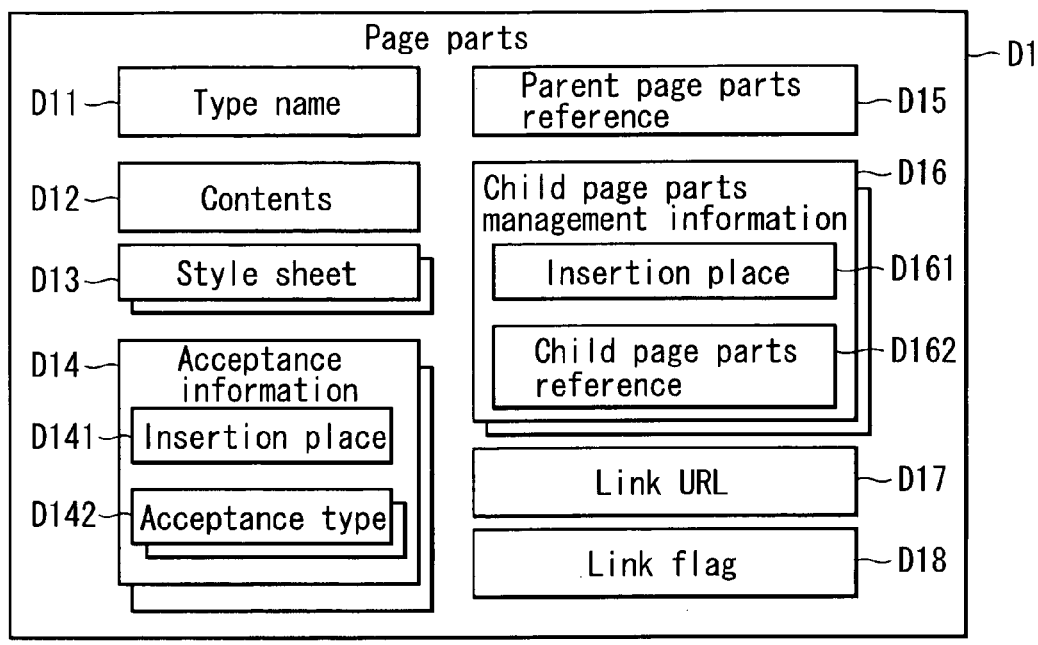
FIG. 4 is a diagram illustrating a data structure of page parts.

FIG. 2 shows an example of functional configuration of the document editing system configured based on the above description. FIG. 4 shows an example of configuration of a global data object handled by this system. First, page parts as object data targeted to be processed by this system will be described here.

This system handles a data object for page parts units, of the configuration as shown in FIG. 4. Page parts are data corresponding to sub-contents on one by one basis. The data include contents of sub-contents itself, of course, and management information required for a function oriented to sub-contents provided by this system.

Page part (a data object) D1 shown in FIG. 4 is composed of a plurality of sub-data objects D11 to D18. In FIG. 4, for example, acceptance information D14 is represented to include insertion place information D141 and acceptance type information D142 therein. Similarly, child page parts management information D16 includes insertion place information D161 and child page parts reference information D162 therein. In addition, for example, as in the acceptance information D14 or child page parts management information D16, sub-data objects expressed to be superimposed in plurality (to be superimposed in double, for example) indicate that a plurality of such sub-data objects exist.

The page part D1 includes the following items of information: a type name D11; a content D12; a style sheet D13; acceptance information D14; parent page parts reference D15; child page parts management information D16; a link URL D17; and a link flag D18. These items of information are contained as an element configuring each partial document extracted from the block Web document or are contained as attributes.

Type is provided to discriminate each partial document according to a data format (difference in format) of a partial document or a difference in category or kind (semantic difference) concerning the contents of the partial document. Identification information for discriminating each type according to a semantic or formal difference of the partial document is a type name. A type name corresponding to a partial document which corresponds to the page part D1 is maintained in the type name D11 contained in the page part D1. This type name is described in an attribute "type" provided to an element (a factor) which is a top node of the partial document.

A partial document corresponding to the page part D1 is maintained in the content D12. When display data is contained in another structured document other than a structured document including the page parts, link information for the display data is stored in the link URL D17. (At this time, the link flag D18 is set). Thus, in this case, the content D12 may be vacant.

The style sheet D13 maintains a conversion rule (a style sheet) for a data format applicable to the partial document maintained in the content D12 and a conversion rule (a style sheet) for converting a data format of the display data into a data format corresponding to the display format or the like by a display format applicable to the partial document. If a plurality of conversion rules are applicable to the display data, it means that the plurality of style sheets D13 are contained in the page part D1. A style sheet is described in an attribute "style" described in an element (a factor) which is a top mode of the partial document.

The acceptance information D14 maintains as the acceptance type D142 a type name of a partial document in which a partial document corresponding to the page part D1 can be accepted (inserted), and maintains the insertion place D141 on a document structure. This acceptance type D142 is described as (an attribute of) an element "accept" in the partial document, and the insertion place D141 is position information which corresponds to an allocation on the document structure of this element "accept".

When a portion corresponding to the page part D1 is included in another partial document, the parent page parts reference D15 is information for associating the page part D1 with page parts corresponding to another partial document which is a parent.

When a partial document corresponding to the page part D1 includes another partial document, the child page parts management information D16 are information for the page part D1 with page parts corresponding to another partial document which is a child. This information maintains an insertion plate D161 of the another partial document on a document structure and child page parts reference D162 which is position information on a document structure of the another partial document. The insertion place D161 is a location of an element (such as an element "import" described later, for example) which instruct insertion of another partial document in partial documents. As an attribute of this element, for example, the child page parts reference D162 is described as position information on a partial document to be inserted.

The sub-data objects shown in FIG. 4 will be described as required in system configuration or description of operation shown in FIG. 2, shown below.

Sub-contents have been described as corresponding to a partial page (a partial document) which the user in one Web page (a Web document) wants to handle independently. In this system, although the page part D1 as shown in FIG. 4 are handled as objects corresponding to sub-contents on a one by one basis, all the pages (that is, one Web page) are processed as one page part.

Figure 3:
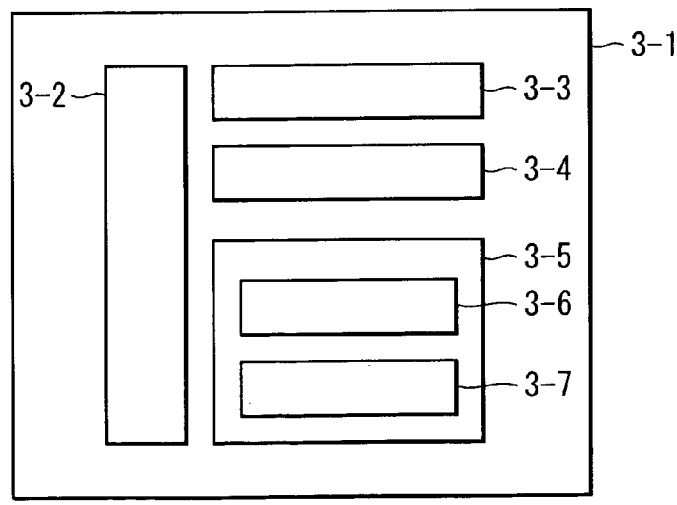
FIG. 3 is a diagram illustrating page parts (sub-contents or a partial document) in one Web page.

A specific description of page parts will be given with reference to FIG. 3. FIG. 3 shows a page part 3-1 as one Web page. A plurality of page parts 3-2 to 3-7 are included in the page part 3-1 corresponding to all the pages. In this system, the page part 3-1 and page parts 3-2 to 3-7 included therein are managed to be in a parent-child relationship. All the pages are regarded as page parts, whereby special processing is unnecessary, and the system is simplified. At the same time, there may be a need for fetching all the pages as part of another page.

Now, functional modules of the document editing system shown in FIG. 2 will be described below.

As shown in FIG. 2, the document editing system is roughly composed of: a host module M1; a document processing module M2; and a desktop pasting module M3. These modules M1 to M3 are respectively independent modules. The host module M1 substantiates and calls the document processing module M2 as required. The document processing module M2 substantiates and call the desktop pasting module M3 as required.

The host module M1 is a container component which accepts (hosts) the document processing module M2. A basic function is to construct a window frame on an OS (Operating System), thereby ensuring a window region for the document processing module M2 to function and to provide a menu, a tool button and the like for the user to operate, thereby conveying an inputted command to the document processing module M2.

Figure 5:
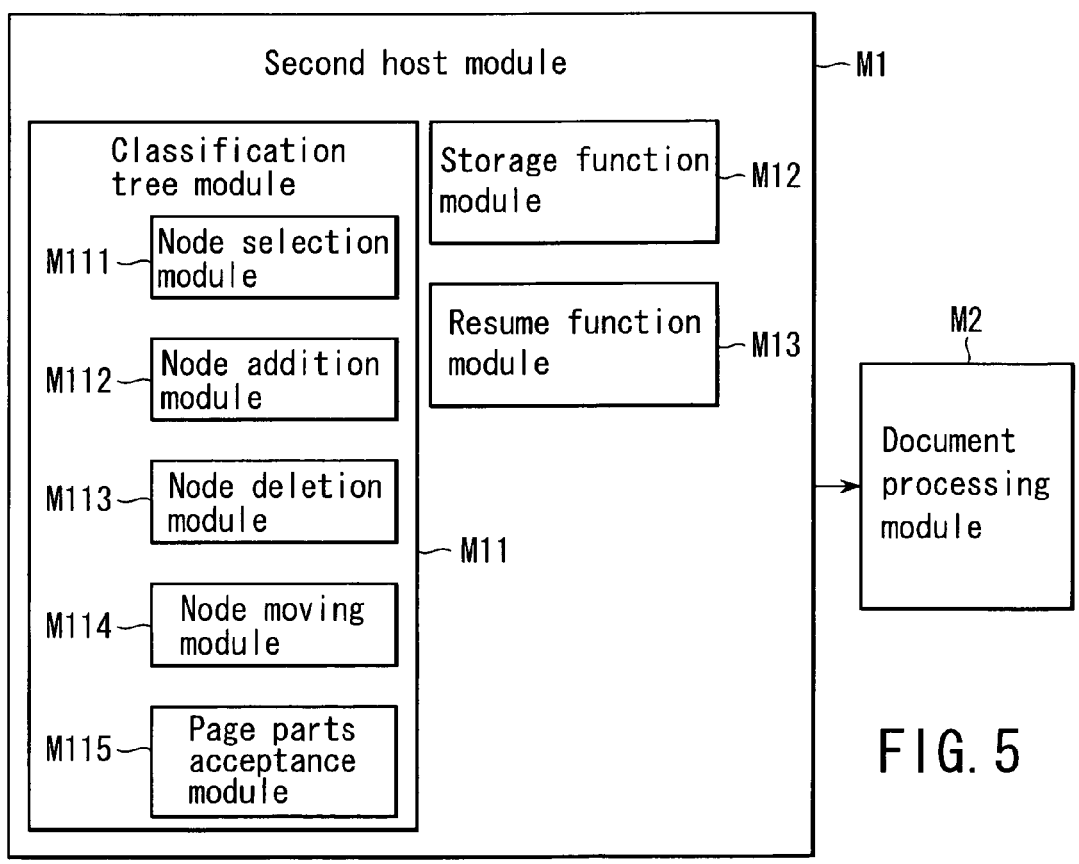
FIG. 5 is a diagram showing an example of functional configuration of a host module.

A Web browser and a page parts album host (dedicated application which provides a function specialized for page parts management as shown in FIG. 5) are specifically assumed as the host module M1. A general Web browser such as INTERNET EXPLORER (trademark) or NETSCAPE (trademark) is created so as to function as a general-purpose document service host. Thus, required registration processing concerning the document processing module M2 may be carried out so that the document processing module M2 can be initiated by calling it from the browser in accordance with the respective browser specification. The details are categorized in the software specification of the general-purpose browser, respectively, and a further description is omitted here. When the above general Web browser is used as a host module, this host module is called a first host module M1.

On the other hand, a host module used exclusively for a document editing system according to the present invention is called a second host module M2. The second host module will be described later.

The document processing module M2 is a Web document processing module which has a blocking function and a function oriented to sub-contents. This module is substituted and called by number of Web pages from the host module M1. That is, one document processing module is produced to one Web page on memory.

The document processing module M2 roughly contains two sub-modules, a page reading module M21 and a block Web document processing module M22.

The page reading module M21 supports the blocking function. First, the page reading module M21 reads a document specified by URL (or a file path on a local machine). If the read document is determined to be a general Web document such as HTML document or XML document which is not a block Web document, the document is converted into the block Web document by executing one of a plurality of methods.

The block Web document processing module M22 provides a function oriented to sub-contents. The module M22 includes five sub-modules: a page parts management module M221; a rendering processing module M222; a GUI processing module M223; an export module M224; and a page parts format adjusting module M225.

The page parts management module M221 has a page parts database M221b which maintains page parts extracted from each page. This module also has a function for changing page configuration such as insertion, moving, or deletion in units of page parts (sub-contents) and a function for storing them.

The rendering processing module M222 has a function for displaying a group of page parts managed by the page parts management module M221 as Web pages.

The GUI processing module M223 provides a GUI function for operating sub-contents such as drag & drop or a context menu on the Web page displayed by the rendering processing module M222. After the GUI operation has been made, a data processing function corresponding to the GUI operation is called in response to the page parts management module M223, and a display screen is rewritten by using the rendering processing module M222.

The GUI processing module M223 calls the export module M224 at the same time. The export module M224 provides a processing function for posting page parts to an external application.

Specifically, when a copy command or the like is executed by drag & drop or on a context menu in GUI operation (when right-click is made on an arbitrary GUI part being displayed, a display is made with respect to this part), the GUI processing module M223 calls the export module M224. Then, this module writes the contents of the page parts in a format which can be read by an external application, into a shared memory region (a clipboard) in which another application or process (these are collectively called an external application) can be read. In this manner, when a drop operation is carried out for an external application, the external application reads the contents from the shared memory region, and thus, can post page parts.

The page parts format adjusting module M225 is a module which, when page parts are posted in the document processing module M2 or between document processing modules, adjusts a data format of sub-contents of page parts. The page parts management module M221 is called when an operation of inserting page parts is carried out. Specifically, when the inserting operation is carried out, in the case where type name of page part to be newly added is not included in the acceptance type D142 included in page part which is an insertion source (this is called an acceptance type name list), the page parts format adjusting module M225 searches a proper combination of conversion rules from a conversion rule database M225b (refer to FIG. 17); converts page parts into acceptable page parts, and returns them to the page parts management module M221. If a combination of conversion rules which can be solved has not been found out, the fact is notified to the page parts management module M221. Then, the page parts management module cancels the inserting operation.

The desktop pasting module M3 provides the user with a function for pasting part of a document which an application has to a desktop as tag paper by a drag & drop operation.

Figure 24:
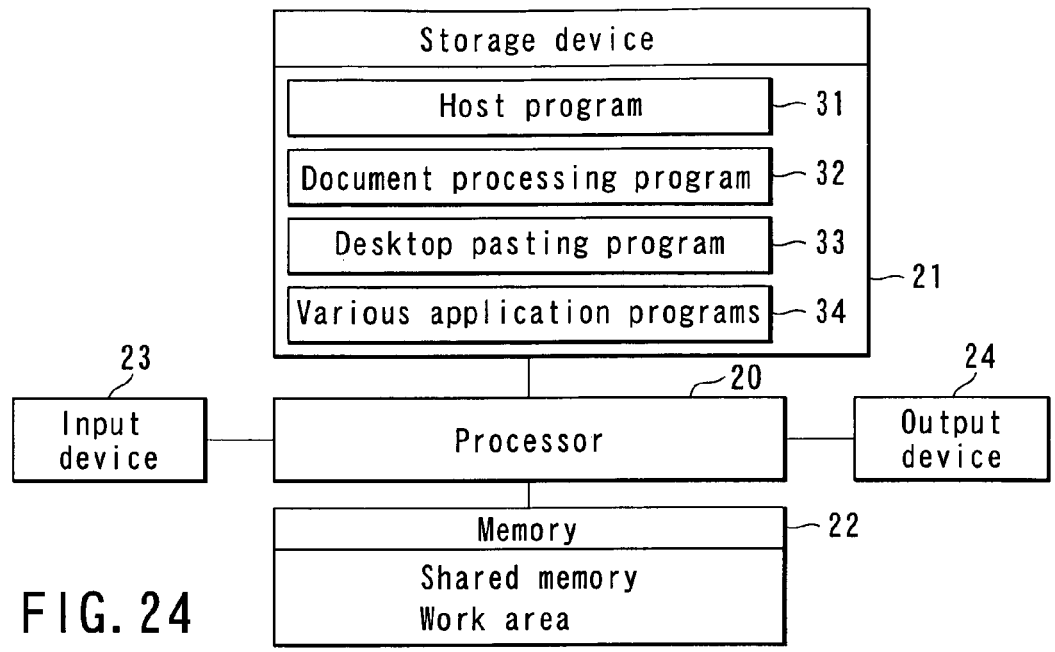
FIG. 24 is a diagram showing an example of configuration when the document editing system shown in FIG. 2 is implemented on a computer (a computing machine), for example.

FIG. 24 shows an example of configuration in the case where the document editing system shown in FIG. 2 is implemented on a computer (a computing machine), for example.

That is, in FIG. 24 the document editing system is composed of: a processor (CPU) 20; a memory 22; an output device 24 such as a display or a printer; an input device 23 such as a mouse or a keyboard; and a storage device 21.

Among them, the storage device 21 is utilized to store a program or the like serving as a nucleus of system controlling or to temporarily maintain data or the like. This storage device stores a host program 31, a document processing program 32, a desktop pasting program 33, various application programs 34 and the like. In addition, the memory 22 is utilized as a shared memory which can be used for executing the above described programs and as a working area for program execution. Also, the processor 20 carries out various required control processings including input/output control or various processings by executing a program in the storage device 21.

The processor 20 primarily provides a function which corresponds to the host module M1 of the document editing system shown in FIG. 2 on the document editing system shown in FIG. 24 by executing the host program 31 in the storage device 21.

The processor 20 primarily provides a function which corresponds to the document processing module M2 of the document editing system shown in FIG. 2 on the document editing system shown in FIG. 24 by executing the document editing program 32 in the storage device 21.

The processor 20 primarily provides a function which corresponds to the desktop pasting module M3 of the document editing system shown in FIG. 2 on the document editing system shown in FIG. 24 by executing the desktop pasting program 33 in the storage device 21.

Further, the processor 20 primarily provides a function which corresponds to these applications each on the document editing system shown in FIG. 24 by executing the various application programs 34 in the storage device 21.

Now, the modules shown in FIG. 2 will be described in detail.

(Host Module)

First, a host module M1 will be described here. As described previously, there are two methods: a method for utilizing a common general-purpose browser such as Internet Explorer or Netscape as a host module; and a method for providing a dedicated host module.

When the common general-purpose browser is used as the host module M1 (in this case, the host module M1 is called a first host module M1), required registration processing concerning the document processing module M2 may be carried out in accordance with the respective browser specification. The details are categorized in the software specification of the general-purpose browser, respectively, and a further description is omitted here.

Here, a description will be given with respect to the second host module M1 which is a host module used exclusively for the document processing system according to the present embodiment.

Figure 6:
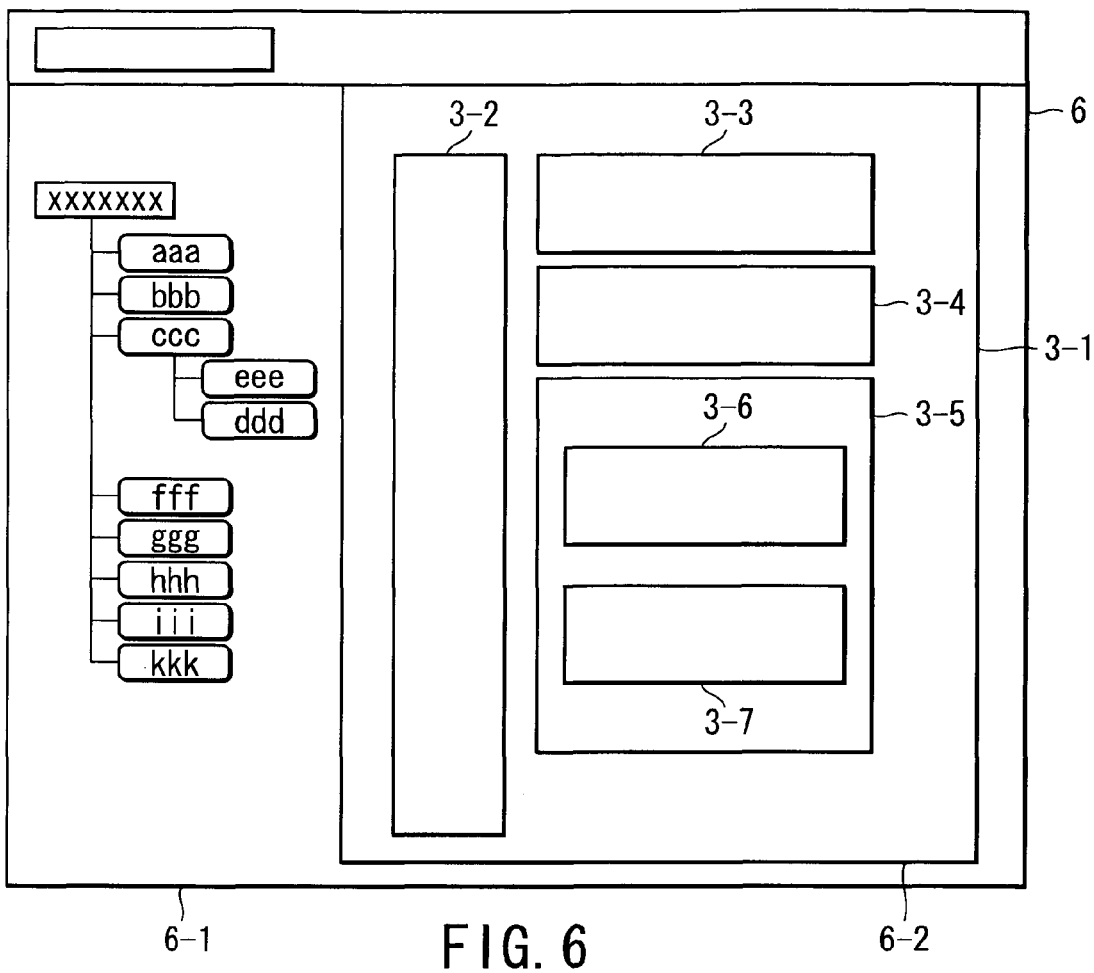
FIG. 6 is a view showing an example of screen display.

The second host module M1 is a software application which can maintain a plurality of pages containing page parts, i.e., block WEB documents therein and which can select and manage the plurality of pages by tree. An execution screen is shown in FIG. 6.

A display region on a screen displayed on a display when the second host module M1 is initiated is composed of a classification tree display portion 6-1 and a Web display portion 6-2.

A plurality of Web pages maintained by the second host module M1 are assigned to nodes of the classification tree portion 6-1, respectively, and the Web page corresponding to the selected node is displayed on the Web display portion 6-2. In FIG. 6, the Web page displayed at the Web display portion 6-2 is the same as the page parts shown in FIG. 3.

The user can browse a plurality of Web pages as page parts by clicking a desired node of the nodes displayed at the classification tree portion 6-1. Also, the user can newly add, delete, or move a node on a tree by operation. These operations are made in the same way as in widely used EXPLORER (trademark).

The user can move or copy page parts by dragging the page parts currently displayed on the Web display portion 602, dropping them onto an arbitrary node, or further dropping them onto the Web display portion 6-2 of the second host module M1 which is opened.

In addition, the other various functions oriented to page parts can be executed by carrying out a variety of GUI operations at the Web display portion 6-2. These functions are provided by the document management module M2 described later in detail, and a detailed description is not given here.

In the case of the first host module M1 configured by using the previously described general browser as another example of the host module, only the Web display portion 6-2 exists on the screen displayed when the first host module M1 is initiated. Similarly, a variety of functions oriented to page parts can be executed by carrying out a variety of GUI operations at the Web display portion 6-2.

A functional configuration of the second host module M1 will be described with reference to FIG. 5.

The second host module M1 is roughly composed of: a classification tree module M11 for carrying out display or operation for the tree of the Web page at the above classification tree portion 6-1; a storage function module M12 responsible for file writing or reading; and a resume function module M13.

The document processing module M2 described later supports a function for displaying a Web page on the Web display portion 6-2.

The classification tree module M11 displays a classification tree and carries out GUI operations such as node addition, deletion, and moving for the displayed classification tree. As program parts for carrying out the above described tree display or GUI operations, program GUI parts generally called "a tree control" are provided from a variety of venders, and the above GUI operations can be carried out by using them.

Tree control is a GUI part which can display a named node on a tree capable of opening and closing and can allocate an arbitrary adding function through the user operation such as node clicking.

In the classification tree module, M11 may be configured by adding a function specific to the second host module thereto on the basis of tree control. The tree control itself is not included in the gist of the present invention, and a description is omitted here.

In the second host module M1, a Web page is assigned to each of the tree nodes. Information for referring to the document processing module M2 is provided in order to enable the module M2 to be referred to by associating the document processing module M2 corresponding to the node with each mode of tree control.

The node selection module M11 is a program module called when any one of the nodes is clocked by tree control. This module is generally called a selection event handler.

A node selection module M111 issues an instruction to the document processing module M2 in which the selected node is associated with the node so as to display a Web page corresponding to the node. In this manner, every time a node is selected, the corresponding Web page is displayed by the document processing module M2 associated with the node.

A node addition module M112 is a program module called when any one of the nodes is added by tree control. This module is generally called an addition event handler. The node addition module M112 newly creates the document processing module M2 (in this state, the Web contents are vacant), and adds reference information for associating the document processing module M2 with the newly added node.

A node deletion module M113 is a program module called when any one of the nodes is deleted by tree control. This module is generally called a deletion event handler. The node deletion module M113 terminates the document management module M2 associated with the node, and deletes it from a memory based on the reference information which the deleted node has.

A node moving module M114 is a program module called when any one of the nodes is moved by tree control. This is generally called a moving event handler. The moving event handler M114 does not carry out processing in particular.

A page parts accepting module M115 is a program module called when page parts are dropped onto any of the nodes by tree control (when a move destination is instructed). This module is generally called a drop event handler. The page parts acceptance module M115 instructs the document processing module M2 associated with the node by using reference information to add page parts based on the accepted page parts data (serialized image). In this manner, the page parts identical to those dragged are created on the Web page corresponding to a node of a drop destination.

A description of the classification tree module M11 has now been completed.

The storage function module M12 is a program module executed when an application terminates. This module is called a termination event handler. The storage function module M12 has a function for writing into a file the information concerning the Web page with which each node is associated. In order to achieve this, this module issues a storage command to the document processing module M2 associated with the node while the nodes of tree are tracked in order.

As a storage method, it is first considered that documents are stored separately. However, contrivance is required such that the respective file names are not duplicated, and files must be collected during next reading, which is inconvenient. Thus, a method for storing all documents collectively in one file is effective.

The resume function module M13 is a program module executed when an application is initiated. This module is called an initialization event handler. The resume function module M13 has a function for returning to a memory the information concerning the previously terminated Web page or the like, and restoring the application in its original state. In order to achieve this, the stored files are opened in order, and the nodes on the tree and the document processing modules M2 associated with these nodes are generated again in order.

(Document Processing Module)

Now, the document processing module M2 will be described here. Prior to a detailed description of each sub-module configuring the document processing module M2, a description will be given with respect to the block Web document which the module M2 handles.

An example of the block Web document is shown below.

```
<?xml version = "1.0"?>
<root style = "root. xsl">
    <a component = "yes" type = "type-a" style = "1. xsl;
a2. xsl; a3. xsl">
        <a>aaaaa</a>
        <a>aaaaaaa</a>
    </a>
    <b component = "yes" type = "type-b" style = "b1. xsl;
b2. xsl:b3. xsl">
        <b>bbbbb</b>
    </b>
    <accept type "type-a; type-b"/>
    <import href =
"http://www.shiba.co.jp/aaaaa.pzx#xpointer(/root/c)"
/>
</root>
```

The above block Web document indicates that there are included partial documents "a" and "b" corresponding to page parts which can be handled independently at an element including an attribute "component" allocated below am element "root". Display data displayed by the partial document "a" is "aaaaa" or "aaaaaaa", and the display data displayed by the partial document "b" is "bbbbb". Further, the Web document beginning with an element "root" indicates that page parts of type "type-a" or type "type-b" can be inserted into a position indicated by a tag "accept".

As is evident from the above block Web document, the partial document in a structured document corresponding to sub-contents can be discriminated by the fact that the value "yes" is specified in an attribute "component" described in the top node (or root node) in the partial document. Here, it is discriminated that a partial document in which the node described in the attribute "component" is defined as a top node corresponds to one sub-content.

This block Web document extends a Web document disclosed in Jpn. Pat. Appln. KOKAI Publication No. 2001-109742.

Also, in the above block document Web document, the tag "import" has a special meaning, and has a function for which page parts of URL specified by an attribute "href" (in the above example, part of page is specified by using URL with XPointer) are inserted into the position. This tag indicates that page parts are provided as an external resource. The page part is totally identical to another page part in handing on page.

In addition, when data is posed via HTTP (Hypertext Transfer Protocol), "Content-Type" must be "text/cmp". A rule is established such that an extend must be "cmp" if an input from another network protocol such as FTP (File Transfer Protocol) or from a file system occurs. This rule is prepared in order for the document editing system to determine whether or not an input document is a block Web document.

(Page Reading Module)

Figure 7:
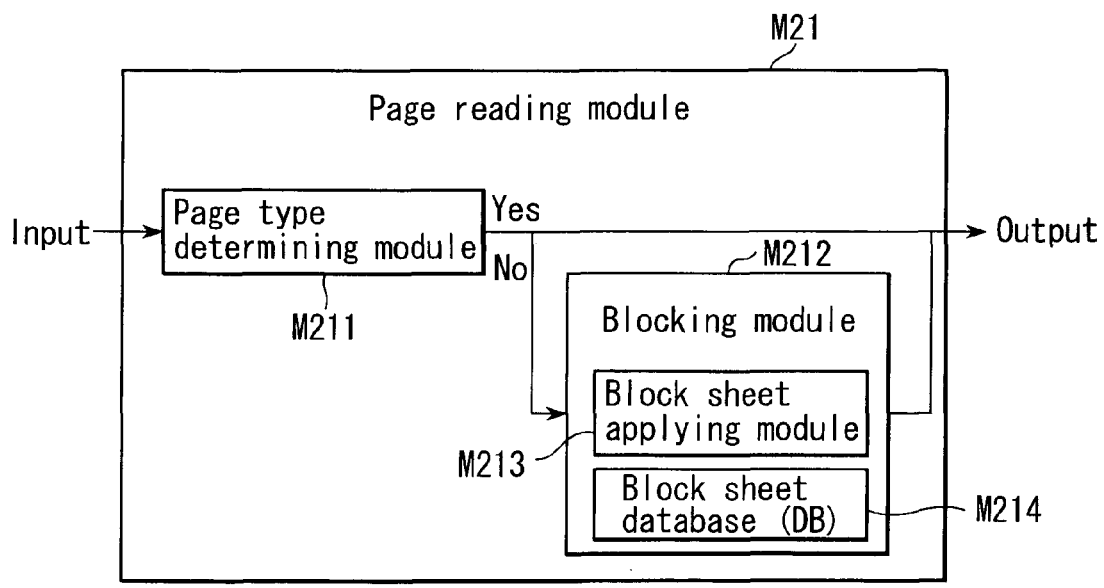
FIG. 7 is a diagram showing an example of functional configuration of a page reading module.

FIG. 7 shows a configuration of a page reading module M2-1, and the arrow indicates a data flow.

The page reading module M21 primarily carries out blocking of Web pages. This module manages document input to the document processing module M2. If a given document is a block Web document, the document is posted to the block Web document processing module M22 through the page reading module M21 as is. If the given document is another Web document (such as HTML document or XML document), the document is converted into a block Web document, and the converted document is posted to the block Web document processing module M22 (FIG. 2).

The page reading module M21 is composed of a page type determining module M211 and a blocking module M212. Web documents entered from a communication such as HTTP or a file system is inputted to the page reading module M21. A well known technique may be used for reading processing from the HTTP communication function or file system, and a description is omitted here.

Figure 8:
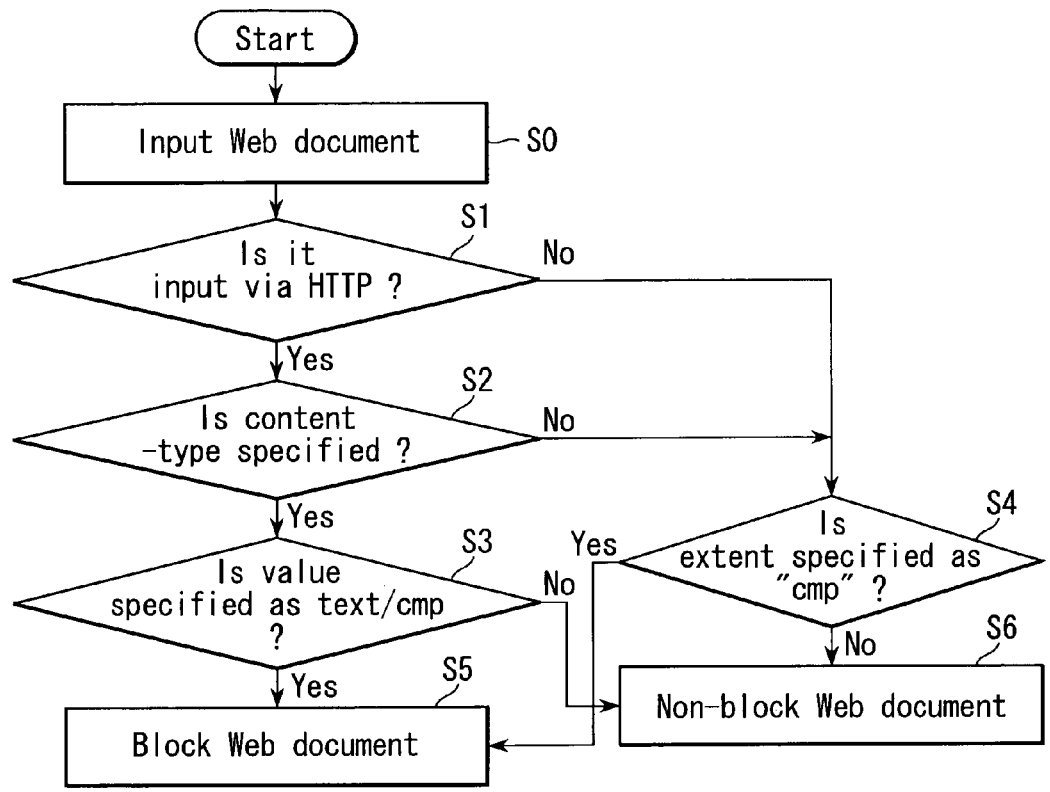
FIG. 8 is a flow chart illustrating an operation of the page reading module.

The input document is posted to the page type determining module M211. The page type determining module M211 determines whether or not the input document is a block Web document in accordance with the procedure shown in FIG. 8. That is, in the case where the input document is posed via HTTP, if "Content-Type" is "text/cmp", the input document is a block Web document (step S1 to step S3). When an input from another network protocol such as FTP (File Transfer Protocol) or from a file system occurs, if the extent is "cmp", the input document is determined to be a block Web document (step S1).

Turning to FIG. 7, if the page type determining module M211 determines that the input document is a block Web document, the document is output of the page reading module as is. If it is not a block Web document, processing for conversion into a block Web document is carried out by the blocking module M212, and the result is outputted.

The blocking module M212 executes conversion processing for a given document by using a conversion rule for blocking (here, referred to as a block sheet), and outputs the resulting block Web document. A block sheet database (DB)

M214 stores the conversion rule so that, with URL of an input document which is a key, the conversion rule corresponding to the input document can be searched. When the input document is input from FTP or a file system instead of HTTP, URL of FTP or file URL is used. As a conversion rule, XSLT is used in this system.

A non-block Document is inputted. (step S10)

If the document is of HTML, a current document is converted into an equivalent XML document (step S11).

Figure 9:
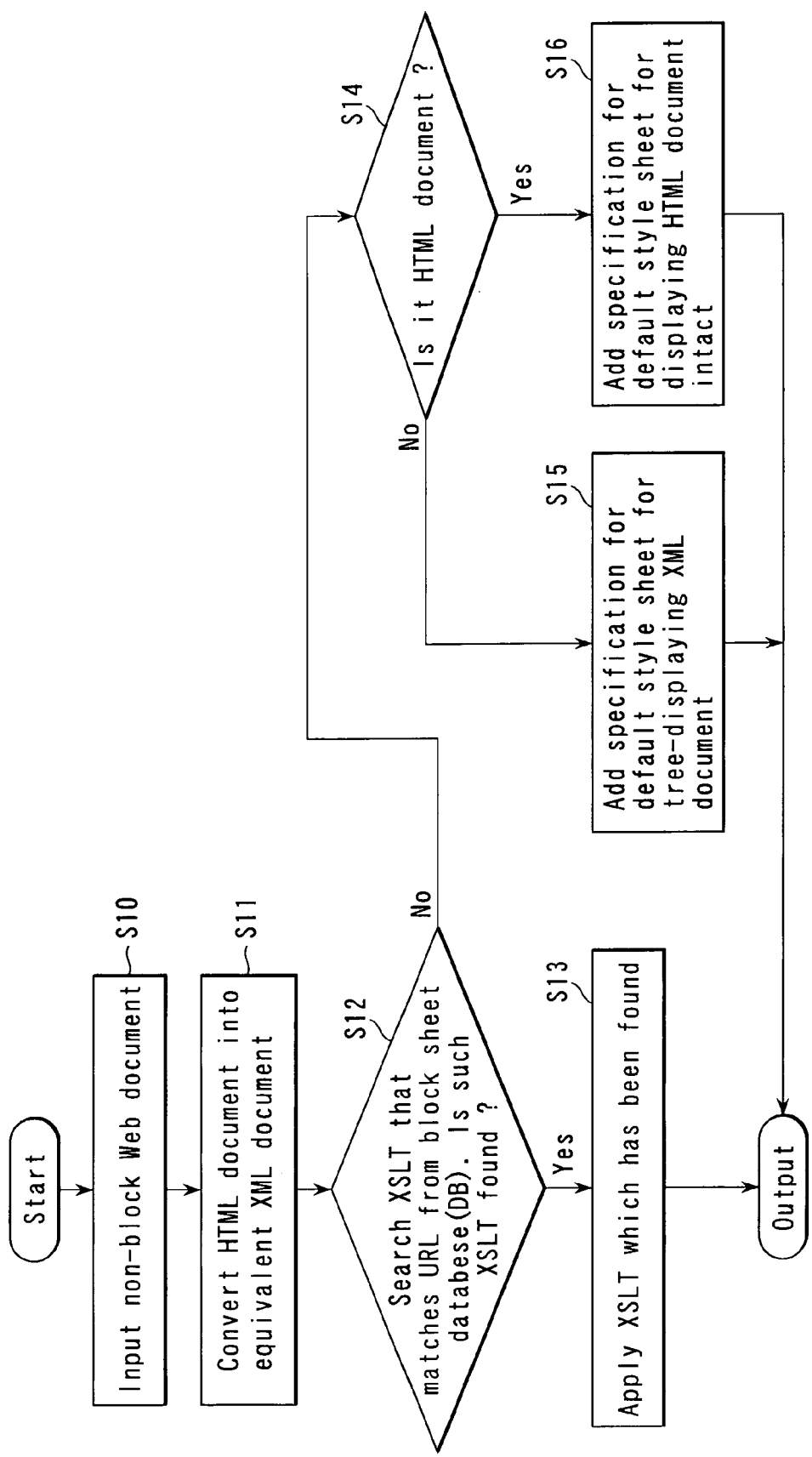
FIG. 9 is a flow chart illustrating a procedure for converting an input document into a block Web document.

A block sheet application module M213 actually carries out conversion processing by using a block sheet DBM 214. A flow of this processing is shown in FIG. 9. This output is posted to the block Web document processing module M22.

Here, a supplemental description will be given with respect to processing (step S12) in the case where a block sheet corresponding to the input document is not found out. When no block sheet corresponds to the input document, no block structure information is provided. Thus, all pages are construed as one page part. That is, an attribute "component" is provided to a root node of the input document. In addition, there does not exist style specification (style attribute) which should be essentially specified in page parts, and thus, a default style which this system has therein is assigned (step S15 and step S16). In the case of the XML document, a style sheet for simply displaying an XML document in a tree manner is a default style. In the case of the HTML document, a style sheet for displaying the HTML document intact is a default style. In this manner, a general XML document or HTML document can be handled as page parts in this system.

(Block Web Document Processing Module)

The block Web document processing module M22 is a module provided as a system nucleus which manages a block Web document inputted by the page reading module M21, displays the document to a user, and provides a convenient GUI operation for sub-contents. Although it has been given in a description of the host module M1, the block Web document managed by one block Web document processing module M22 is one document. When a plurality of pages (a plurality of documents) are managed, it is required to generate the block Web document processing module M22 by the number of pages.

The block Web document processing module M22 is configured of a plurality of sub-modules, and these modules are cooperatively operated each other. Hereinafter, a detailed description will be given with respect to each of these modules.

(Page Parts Management Module)

The page parts management module M22 is a base service module oriented to another module which includes pages, manages all the page parts in these pages, and provides an API (application programming interface) for configuration change. A data structure of page parts is as illustrated in FIG. 4.

Figure 10:
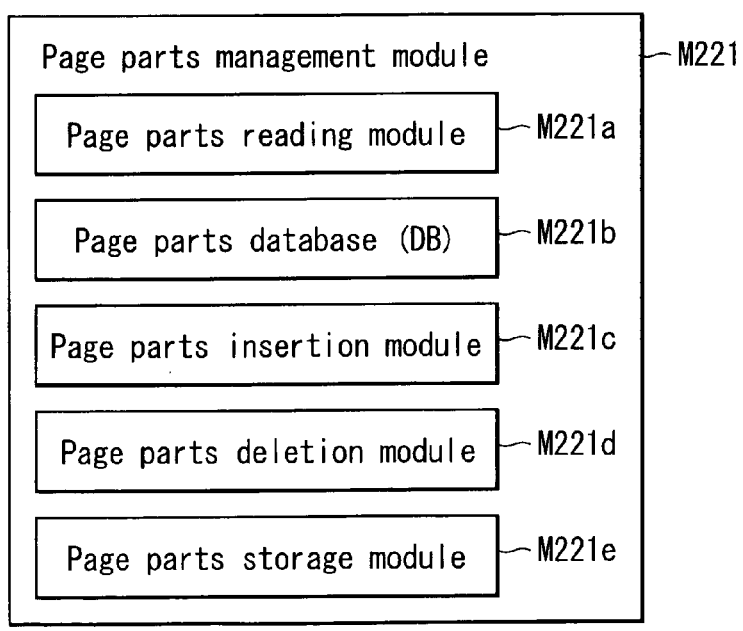
FIG. 10 is a diagram showing an example of functional configuration of a page parts management module.

As shown in FIG. 10, the page parts management module M221 is composed of five service modules, i.e., a page parts reading module M221a; a page parts database (DB) M221b; a page parts insertion module M221c; a page parts deletion module M221d; and a page parts storage module M221e.

The page parts reading module M221a analyzes an inputted block Web document, creates page parts for a partial document corresponding to sub-contents contained in the block Web document, and registers a finally prepared group of page parts in a page parts database M221b.

In a block Web document, the sub-contents independently handled are a block Web document itself, are included in a partial document when an element (factor) having an attribute "component" in the Web document assigned thereto is defined as a top node, or are an external resource specified by an element "import", for example, URL.

Then, the page parts reading module M221a first extracts a partial document having the attribute "component" and a partial document composed of the element "import" from an inputted block Web document. However, with respect to the sub-contents themselves (entity of sub-contents), the partial document having the attribute "component" assigned thereto is included in a child element of the element provided as its top node. In addition, in the case of the element "import", the contents which is an external resource specified by an attribute "href" of the element are downloaded by using a publicly known technique, whereby the entity (content) of the sub-content can be acquired.

With respect to the sub-contents extracted from the block Web document, a page part D1 is created as shown in FIG. 4 based on each of a partial document in which an element having the attribute "component" assigned thereto is defined as a top node, and a partial document composed of an element "import". Although a page part D1 with respect to the block Web document itself being sub-contents is created, such creation is carried out in the same way as above.

Sub-contents (display data), for example, are written into a content D12 in the page part D1 of FIG. 4.

When each page part is created, a parent-child relationship between page parts is obtained from that between partial documents represented in a block Web document (as in the parent-child relationship between elements in an XML document). Thus, with respect to a page part in which a parent-child relationship exists, information on pointer or link for associating a child page part to the page part (child page parts reference D162) or a place (position) D161 in which the child page part in the page part is inserted is written as information on pointer or link for associating the page part with a parent page part (i.e., hereinafter, referred to as parent page part reference D15) or information for associating the page with a child page part (i.e., hereinafter, referred to as child page parts management information D16).

With respect to sub-contents, URL per XPointer which is pointer information for specifying a position on a document structure of a block Web document including a partial document corresponding to the sub-contents is written into the link URL D17. In the case of sub-contents externally acquired by an element "import", URL with XPointer specified by an attribute "href of an element "import" is written into the URL D17.

With respect to each of a partial document having an attribute "component" and a partial document composed of an element "import", if an attribute "type" is described as its attribute, the corresponding value is written as the type name D11. If an attribute "style" is described (if that value is divided into a plurality of character strings by semicolons each character string corresponds to a style sheet identifier, for example), such each character string is written as the style sheet D13, respectively.

With each of a partial document having an attribute "component" and a partial document having an element "import", for example, if an element "accept" exists as a child element in the partial document, it designates that a sub-content which can be inserted exist in the sub-content corresponding to the partial document. A type name of such a sub-content which can be inserted (can be accepted) is indicated as an attribute. In this case, the acceptance information D14 for inserting sub-contents is written. First, a structural position of the element "accept" is written as the sub-contents insertion place (position) D141. If an attribute "type" exists in the element "accept" (if that value is divided into a plurality of character strings by semicolons each character string corresponds to an identifier of type (acceptance type) of an acceptable sub-content, for example), such each character string is written as the acceptance type D142.

There is a possibility that a plurality of elements "accept" exist, and write processing is carried out by the number of the elements.

The page parts database M221b stores and manages all the page parts contained in a block Web document. Each page part has reference information for a parent page part and a group of child page parts. Thus, information on arbitrary page parts can be acquired by sequentially tracking it based on this reference information.

The page parts insertion module M221c is provided for newly adding and inserting page parts as a child of an arbitrary page part.

Figure 11:
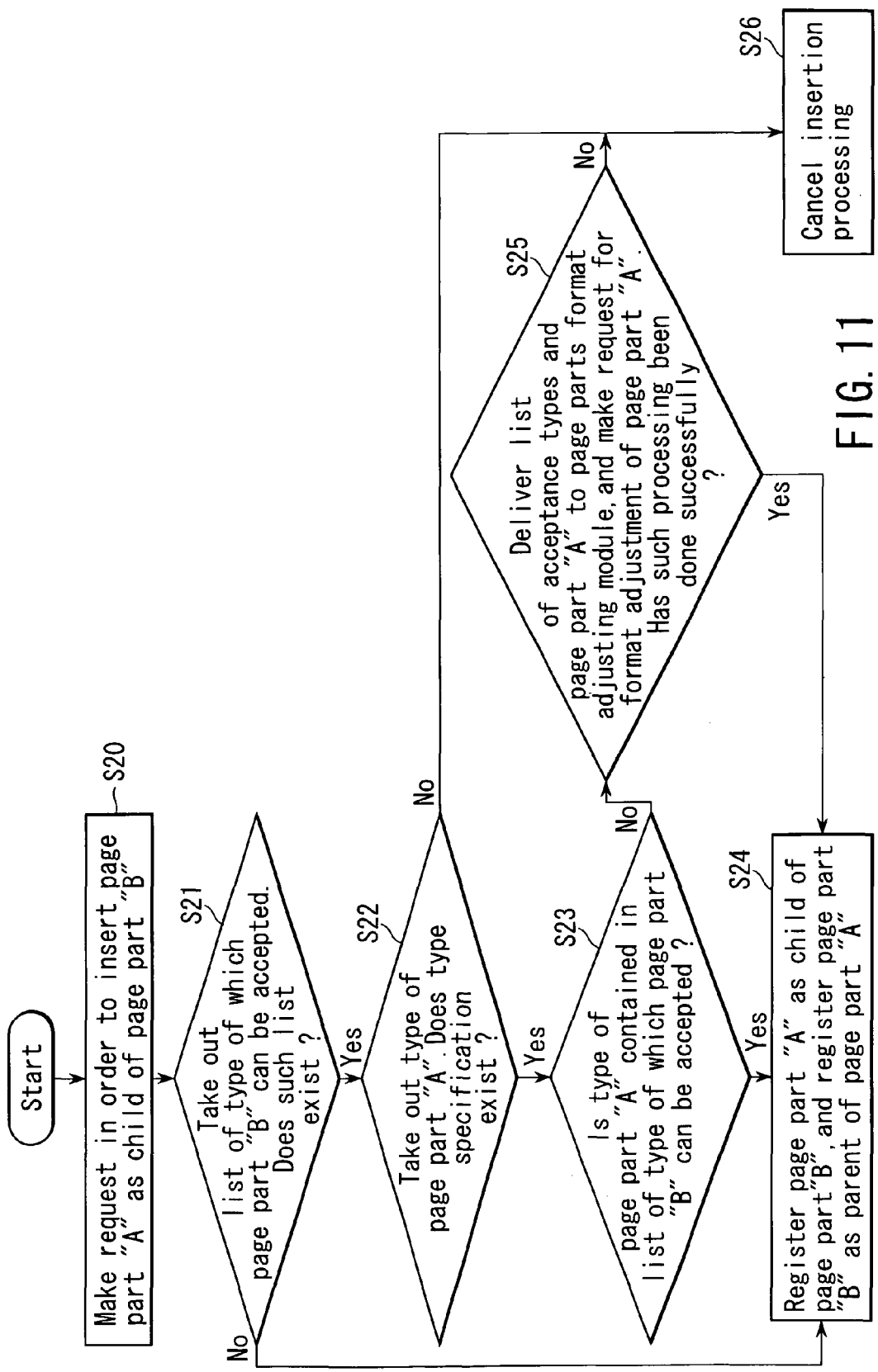
FIG. 11 is a flow chart illustrating an operation of the page parts inserting module.

FIG. 11 is a flow chart illustrating a processing operation of the page parts insertion module M221c. Hereinafter, a description will be given with reference to FIG. 11. For example, when the page part A is inserted into the page part B (step S20), the acceptance type D142 contained in the acceptance information D14 of the page part B is taken out from the page part data base, and the type name D11 contained in the page part A to be inserted is fetched. Then, it is determined whether or not a type name of the page part A written as the type name D11 exists in the acceptance type D142 (steps S20 to S23). When the type name exists, the child page parts management information D16 on the page part A is registered in the page part B in order to be associated as a page part of a child of the page part B (a child page part). In addition, the parent page part reference D15 on the page part B is registered in the page part A in order to associate the page part B as a page part of a parent of the page part A (a parent page part) (step S24).

In step S23, when a type name of the page part A written as the type name D11 does not exist in the acceptance type D142, the page parts format adjusting module M225 is called in order to implement insertion of the page part A after converted into a page part of a proper type. At this time, the acceptance type D142 of the page part B and the page part A are posted to the page parts format adjusting module M225, and conversion is requested so that type of sub-contents of the page part A is accepted by the page part B.

When a type of sub-contents of the page part A can be converted into a type acceptable by the page part B, processing goes to step S24.

In step S22, when an acceptance type is not specified for the acceptance information D14 of the page part A or when a type of sub-contents of the page part A cannot be converted into a type acceptable by the page part B, processing goes to step S24 in which insertion of the page part A into the page part B is rejected.

Turning to a description of FIG. 10, the page parts deletion module M221d is provided to delete arbitrary page parts. Specifically, from a parent page part to be deleted, the child page parts management information D16 for accepting the page part to be deleted is deleted. The page part itself to be deleted is deleted from the page part database. At this time, when a partial document included in a partial document (i.e., a child partial document) exists in the partial document corresponding to a page part targeted for deletion, the page part corresponding to the included partial document is also deleted from the page part database. Movement of page parts can be achieved by combining a function of a page parts insertion module with a function of this page parts deletion module.

The page parts storage module M221e has a function for storing a file of an arbitrary page part, and a function for storing a specified page part. When using this function, a page part to be stored and a file name are specified. However, not only the specified page part but also a posterity page part thereof are targeted for storage.

There are three types of storage formats, i.e., a block Web document format, a Pure XML format, and an HTML format. The block Web document format includes a specific expression for blocking or link such as the attribute "component", element "accept", or element "import". Block structure information or a link relationship can be restored even if it is loaded in a page parts storage database.

The Pure XML format is such that these specific expressions for blocking have been removed. The HTML format is such that the currently displayed HTML state is stored intact.

In the case of the block Web document format and Pure XML format, the content D12 of a posterity page part of the page part is synthesized with the content D12 of the page part D1, thereby determining the contents of storage. In the page part D1, an insertion place D161 in which each page part and an insertion place D161 into which such each page part is to be inserted are written as the child page parts management information D16. This information is used for synthesizing contents.

Figure 12:
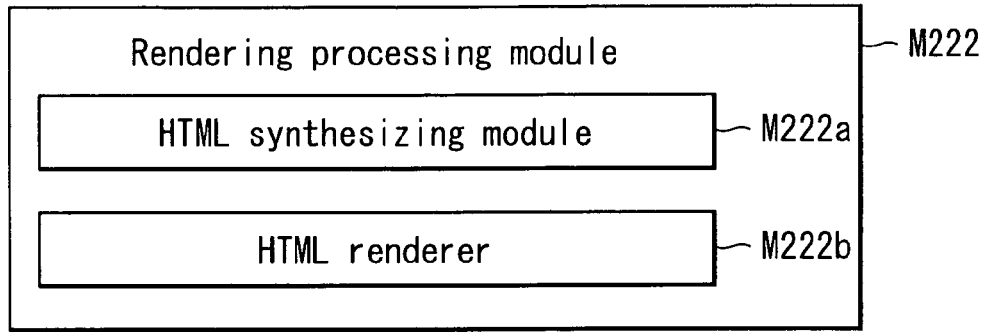
FIG. 12 is a diagram showing an example of functional configuration of a rendering processing module.

On the other hand, in the case of HTML, the contents of storage are determined by executing an HTML synthesizing module M222a described later (refer to FIG. 12).

(Rendering Processing Module)

The rendering processing module M222 has a function for displaying page parts.

As one of the important uses, a block Web document analyzed by the page parts management module M221 is displayed at the Web display portion 6-2 on a display screen, as shown in FIG. 6.

A page part may be included in another page part or may include such another page part, as described previously (a page part inevitably has an inclusive relation with another page part). It is insufficient if the style sheet D12 of the page part is merely applied to the sub-contents corresponding to each page part. Processing for inserting the result of the style sheet application of each child page part of that page part is required. In contrast, in this system, an element "import" is prepared for the style sheet, and a type name of a child page part targeted for insertion is written as an attribute "type" of the element "import" (if it is omitted, any type is acceptable). A command "import" is issued intact as an output together with HTML merely by carrying out XSLT (style sheet) application processing. Thus, the HTML is analyzed, and HTML synthesizing is carried out.

The element "import" in this style sheet (also simply called "import") is provided for HTML synthesizing to be displayed on a screen. This is analogous to "import" described in the block Web document, but it is another command.

Specifically, assume that there exists a style sheet in which the following result of application is obtained.

```
<html><body>
    <h1>Title</h1>
    <div><import type = "type-a"/></div>
    <div><import type = "type-b"/></div>
</body></html>
```

At this time, the style application result of a child page part of type "type-a" enters a first element "div", and the style application result of a child page part of type "type-b" enters a second element "div".

The HTML synthesizing module M222a carries out this synthesizing process. The HTML synthesizing module M222a applies a style sheet to a specified page part (a specified style sheet or a first one in the case a plurality of style sheets exist), thereby obtaining HTML.

All the elements "import" are searched from among the obtained HTMLs, and the result of HTML obtained by applying a style sheet to the child page part specified by an attribute "src" with respect to each of these HTMLs is inserted instead of the elements "import". However, when a command "import" is included in the style application result of a child page part, the style application result of that child page part is inserted similarly before the above insertion. This process is carried out recursively.

When this recursive process completes, one HTML in which the style sheet application results of all child page parts can be obtained. This result is posted to an HTML renderer M222b shown in FIG. 12, whereby HTML is displayed. The HTML renderer M222b for use in this procedure is the existing component which has a function for displaying the inputted HTML. This renderer also incorporates a general browser.

A description of processing required for displaying a block Web document has now been completed. It should be noted that some of these matters have been omitted for clarity. Immediately after carrying out style sheet application to each page part or its child page part, thereby obtaining HTML, a GUI processing initialization module M223a of a GUI processing module M223 is called while reference to route element and a page part of the obtained HTML is defined as an input. This is because a GUI operating function such as drag & drop or context menu for sub-contents is inserted in the synthesized HTML. A detailed description will be given later.

(GUI Processing Module)

Figure 13:
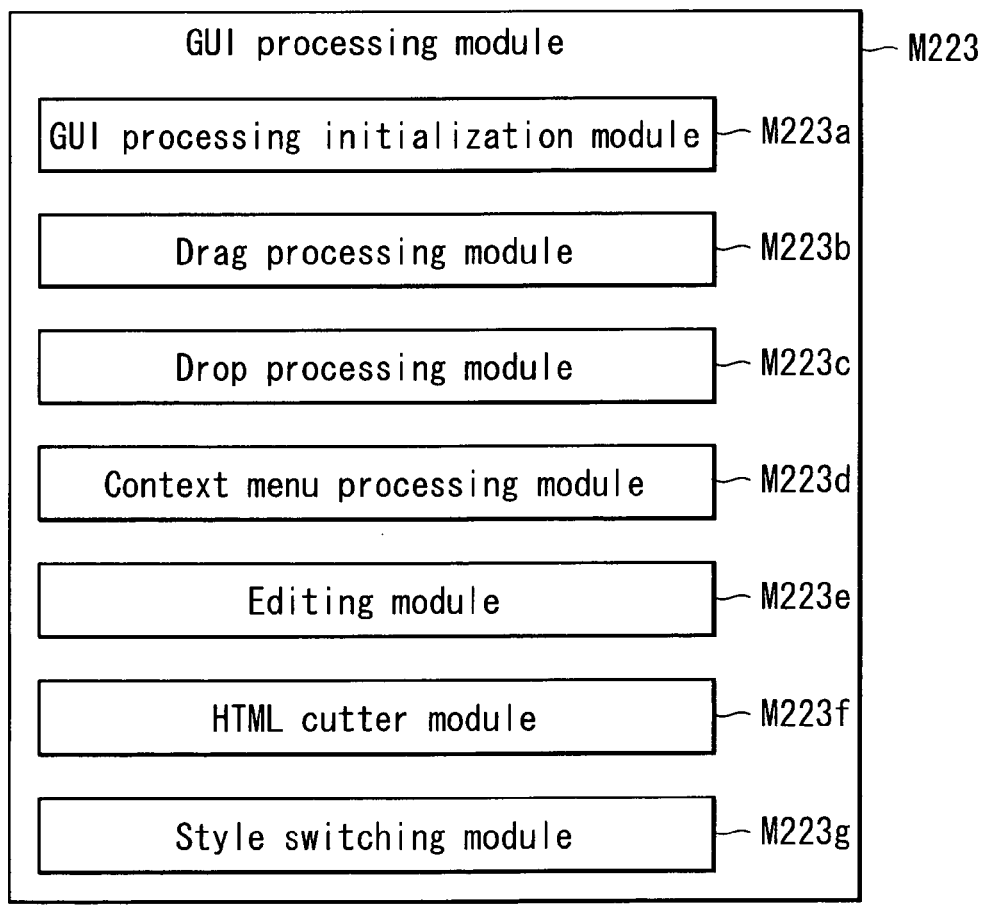
FIG. 13 is a diagram showing an example of functional configuration of a GUI processing module.

The GUI processing module M223 is a module which provides a GUI operating function oriented to sub-contents such as drag & drop or a context menu to page parts which has been displayed. This module has a configuration as shown in FIG. 13.

The GUI processing initialization module M223a carries out processing for registering elements or page parts of HTML targeted for processing (operated to be selected by a mouse or the like) relevant to a drag & drop processing module M223b and a context menu processing module M223c which are described later.

The GUI processing initialization module M223a is called by inputting two items of page parts reference information and route element reference information which is a factor (element) of an HTML document to which page parts are assigned in display. Then, these items of information are registered as an event in the drag processing module M223b, drop processing module M223c, and context menu processing module M223d, thereby bonding processing which corresponds to such an event.

In this manner, when a drop & drag operation or a context menu (right-click) operation has been carried out in a registered HTML element, these processing modules are called, and services oriented to sub-contents function.

In addition, these processing modules has a correlation table between HTML elements and page parts, and thus, the target page parts can be specified. Therefore, a GUI service function can be provided based on the contents of page parts.

Now, processing of these event handlers will be given here.

The drag processing module M223b is a processing module executed when a display region of an HTML partial document corresponding to one page part has been dragged. This module is generally called a drag event handler. The user can move or copy page parts by the drag & drop GUI operation. The drag processing module is responsible for its first-half part.

Figure 14:
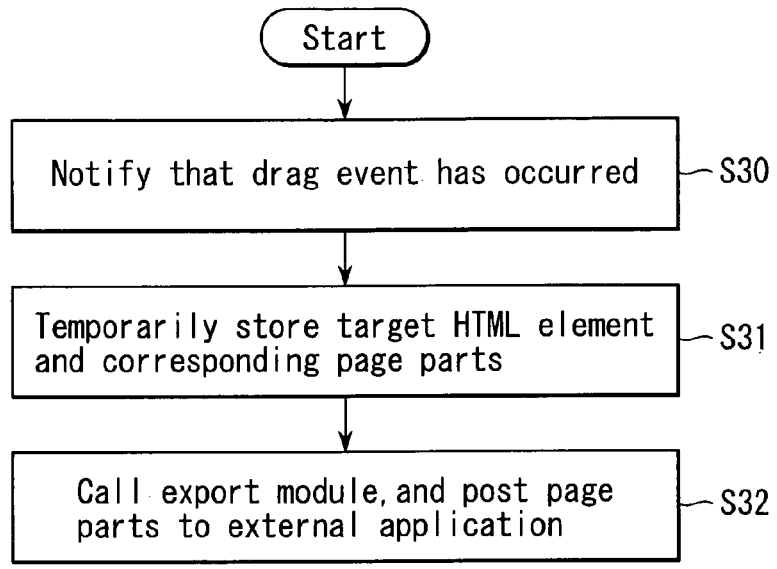
FIG. 14 is a flow chart illustrating an operation of a drag processing module.

In this processing procedure, as shown in FIG. 14, when a drag operation is carried out for a partial document which corresponds to display data selected on a screen, parts data corresponding to the display data targeted for operation is temporarily stored in a memory (step S30 and step S31). In this way, processing to prepare for a drop event which is subsequently generated is carried out. In the supplemental point of view, this drop destination may be a block Web document of another process, may be another application such as a mailer (E-mail software) or OA software, or may be a desktop without being limited to in the range of the same pages. Then, in step S32, the page part is posed to the export module M224 by calling the export module M224 shown in FIG. 16 to transfer the page part to an external application.

Figure 15:
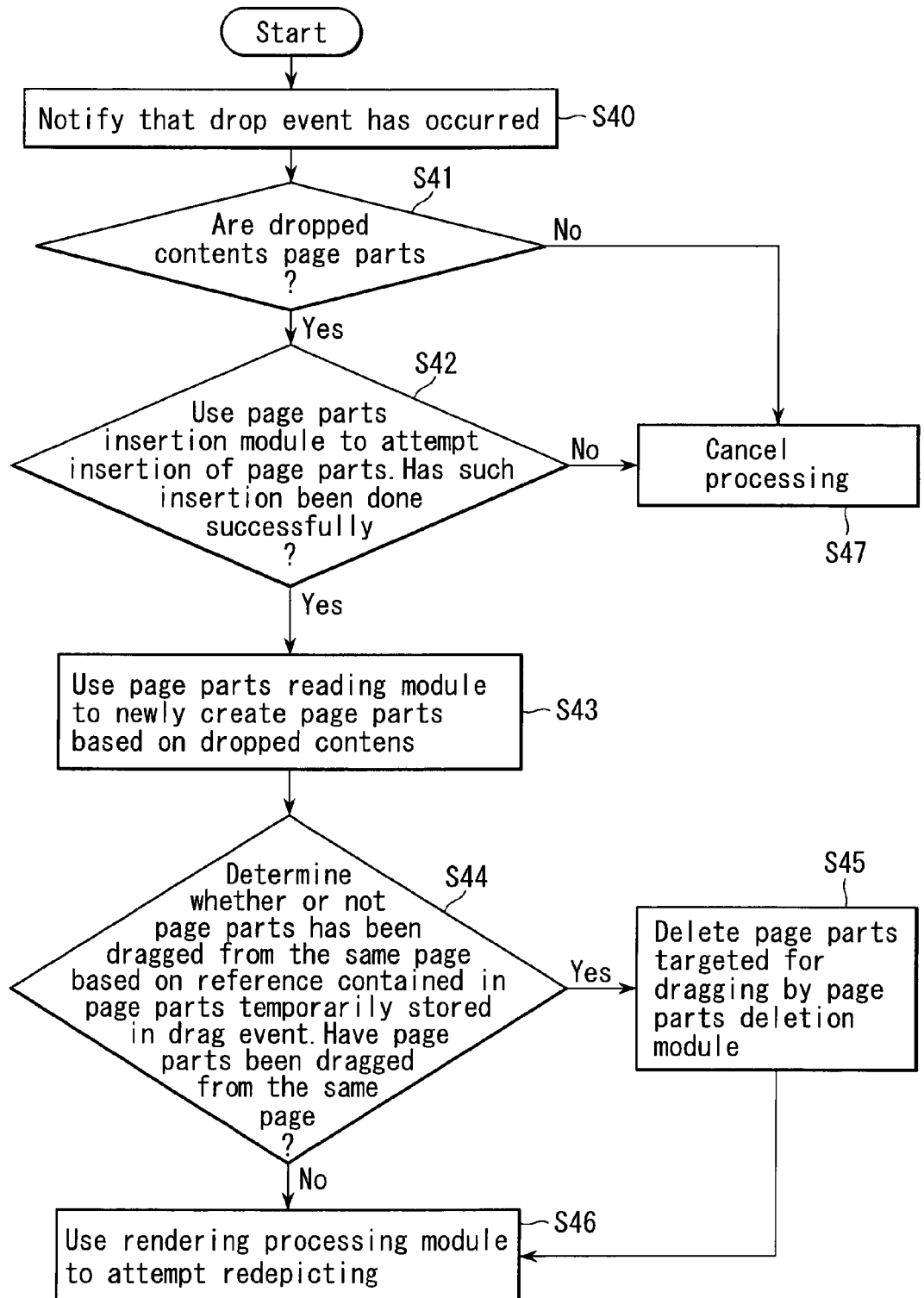
FIG. 15 is a flow chart illustrating an operation of a drop processing module.

Subsequently, the drop processing module M223c (FIG. 13) is a processing module executed when something is dropped on a page part. This module is generally called a drop event handler. This handler is responsible for a latter-half part of the drag & drop GUI operation. The detail on this processing procedure is as shown in FIG. 15. When a drop event whose sub-contents are targeted for operation occurs, a page part corresponding to the sub-contents targeted for operation is read out from the memory, and the sub-contents are inserted into a position specified by a drop operation using the page parts insertion module M221c (steps S40 to S42). When the sub-contents are inserted, the page part corresponding to the dropped sub-contents is newly created. By referring to the reference information D15 for a parent page in a page part which corresponds to the sub-contents targeted for operation, it is determined whether or not the page part targeted for operation has been dragged from the same page. If the page part has been dragged from the same page, the page part targeted for operation is deleted from the page part database M221b by using the page parts deletion module M221d (step S43 to step S45). Then, re-depicting is attempted by using the rendering processing module M222 (step S46). On the other hand, in step S44, if a page part targeted for operation is not dragged from the same page, processing goes to step S46.

In the supplemental point of view, when drop is carried out while the mouse right button is held, the user interprets that a link is intended, and sets a flag (link flag D18 of FIG. 4) indicating the link (the user sets the flag to "1"). In this case, the step of determining whether the right drop is carried out is added between the step S42 and the step S43 of FIG. 15. In the case of the right drop, the link flag D18 is set to "1". Otherwise, the link flag D18 is set to "0". In this case, the link information may be stored in the link URL D17.

When the link is established, even if the sub-contents of page parts of a link destination has changed, there is an advantage that the sub-contents of its latest version are displayed because the page parts are acquired at the link destination when the block Web document is displayed. For example, the user can create one's original portal page which daily changes, the portal page including both of a sub-content called "CD sales best 10" in one block Web document and a sub-content called "book sales best 10" in another block Web document, for example, by registering a desired page part link in a scrap book described later.

The context menu processing module M223d (FIG. 1) is a function which pops up a menu of executable commands when it is right-clicked on a page part. This system provides a delete command, an edit command, a create command, an HTML cutter command, and a style change command on a context menu. When the delete command is selected, the page parts deletion module M221d (FIG. 10) is executed. The rendering processing module M222 (FIG. 2) is executed, and deletion of page parts is carried out.

The edit command and create command edit the existing or new page part, and an edit module M223e (FIG. 1) supports these processes.

Figure 20:
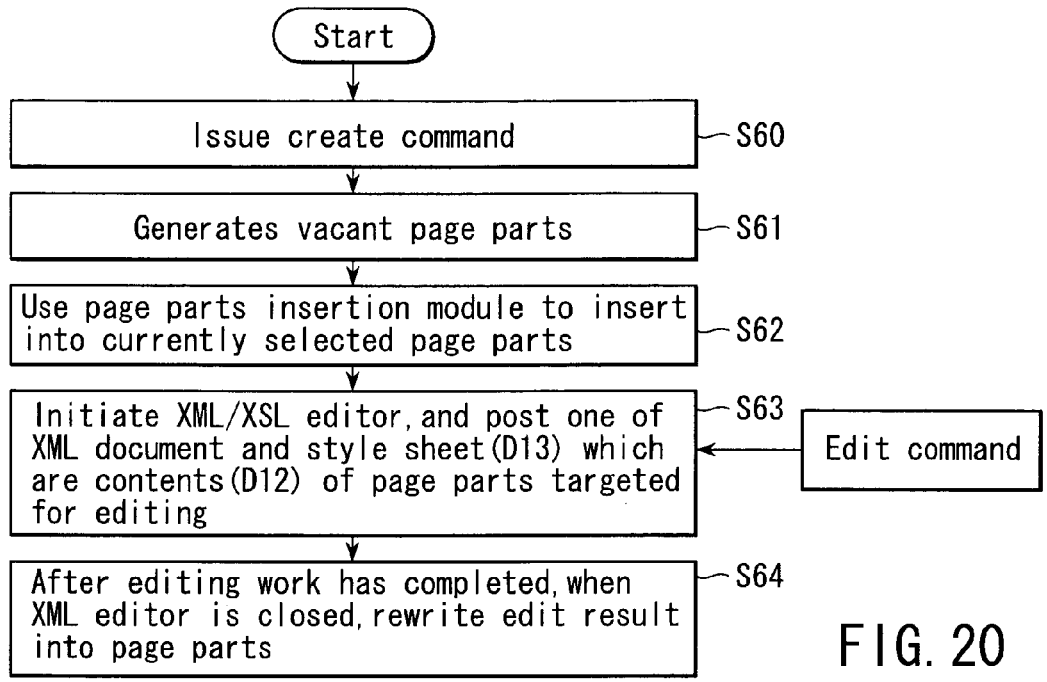
FIG. 20 is a flow chart illustrating an operation for editing page parts.

A specific flow of processing is shown in FIG. 20. In FIG. 20, for example, after a desired sub-content on the Web display portion 6-2 shown in FIG. 6 has been selected, when a create command is selected, a vacant page part is created. Then, this vacant page part is inserted into the page part corresponding to the selected sub-content by using the page parts insertion module (step S60 to step S62). Then, an XML/XSL editor for editing an XML document or an XSLT document is initiated, and a variety of edit commands are used, thereby creating the content D12 in the created page part or the contents (entity) of the style sheet D13 (step S63). After the editing work has terminated, when the XML/XSL editor is closed, the editing result is written into the content D12 or style sheer D13 in the page part which is created in advance (step S64).

The existing XML/XSL editor may be initiated in step S63.

The HTML cutter command is a function in which, when an input page is originally a general HTML (in this case, the HTML document is converted into a block Web document such that the whole text is one item of parts data), the user specifies a range at the Web display portion 6-2 of FIG. 6, and divides that range as a page part. An HTML cutter module M224f supports this function. When the range is divided as a page part, it can be handled as independent sub-contents. A specific flow of processing of the HTML cutter is shown in FIG. 21.

Figure 21:
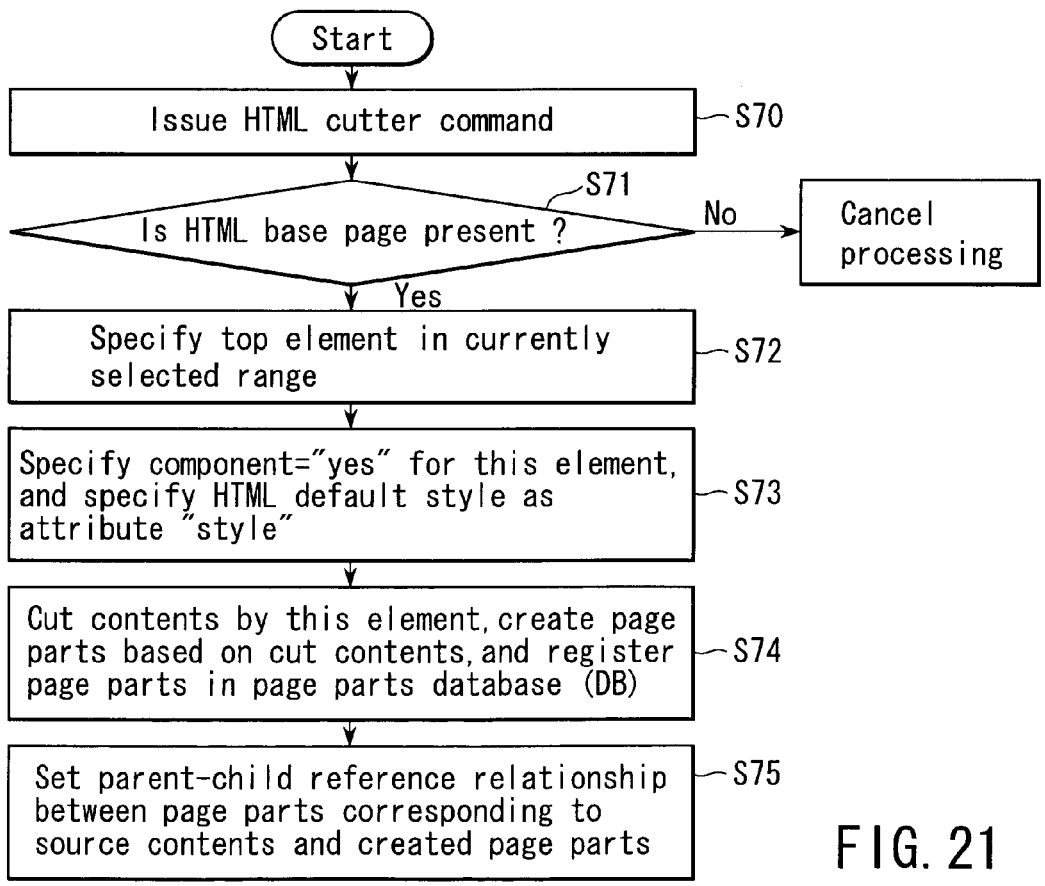
FIG. 21 is a flow chart illustrating an HTML cutter processing operation.

In FIG. 21, for example, when input is done for the document processing module M2, it is assumed that a general HTML document is converted into a block Web document such that the entirety is provided as one item of part data through the page reading module M21; and further, the converted document is displayed at the Web display portion 6-2 shown in FIG. 6 via the page parts management module M221 or rendering processing module M222 and the like. At this Web display portion 6-2, after the user has selected a desired region, when the user select an HTML cutter command, a top element in the currently selected range is specified (step S70 to step S72).

To the specified top element, the element adds the attribute "component" and the style attribute for indicating one sub-content. That is, "component="yes"" is written into the element, and identification information on a style sheet having an HTML default style described thereon is written into the element (step S73). The contents in the selected range, i.e., the page part corresponding to a partial document composed of elements (factors) in the selected range below the above top element, is newly created, and is registered in the page part database (step S74).

A parent-child relationship is established between the page part corresponding to a source content (one page as one block Web document) and the newly created page part. Thus, based on this parent-child relationship, as described previously, the parent page parts reference D15 in each page part and the child page parts management information D16 are written (step S75).

In the supplemental point of view, in determining whether or not an HTML based page exists in step S71, it may be determined whether or not a style sheet is an HTML default style. Of course, in the case of a block Web document or other various structured documents as well, a desired partial document may be delimited as sub-contents from these structured documents (i.e., partial documents) by using a command equivalent to the above HTML cutter command.

A style change command is a function which causes the user to select a desired style from among a plurality of style sheets D13 registered in page parts, and re-displays the page part D1 on the selected style sheet. A style change module M223G (FIG. 13) supports this command. A specific flow of processing for style change is shown in FIG. 22.

Figure 22:
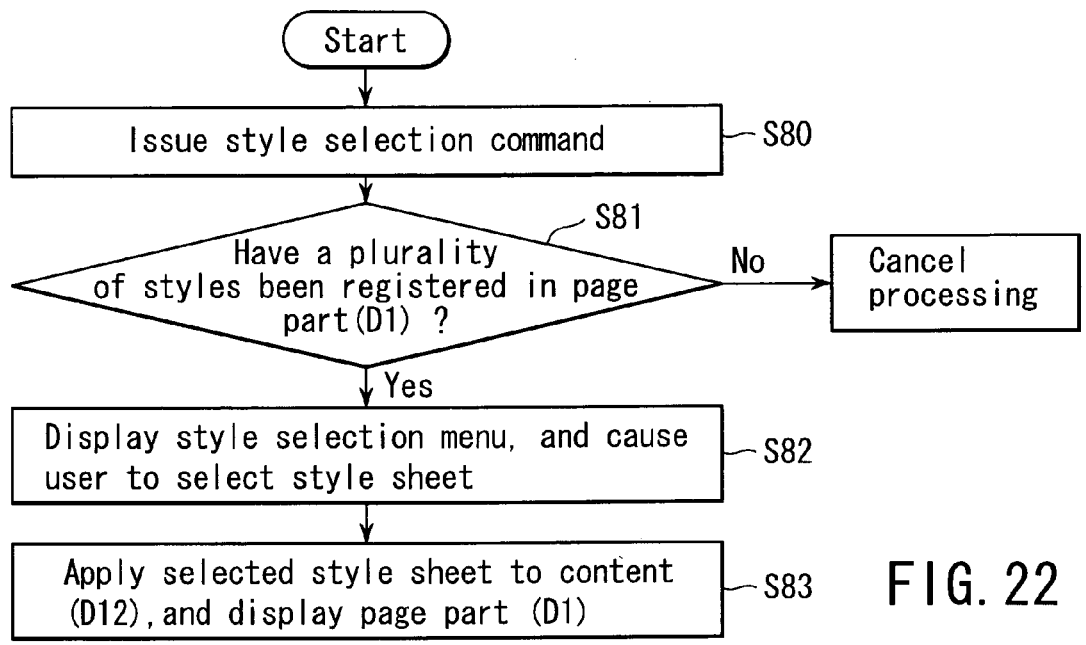
FIG. 22 is a flow chart illustrating a style switch processing operation.

In FIG. 22, for example, after a desired sub-content at the Web display portion 6-2 shown in FIG. 6 has been selected, a style selection command is selected (step S80). In step S81, when a plurality of style sheets D13 are registered in the page part D1 corresponding to the selected sub-content, processing goes to step S82. When only one style sheet D13 is registered, processing is canceled intact.

In step S82, a menu screen for selecting any one of a plurality of style sheets registered in the selected page part is displayed. From among these sheets, a style sheet selected by the user is applied to the selected sub-content (content D12 in page in page part D1), and the selected style sheet is displayed at the Web display portion 6-2 (step S83).

Commands such as cut, copy, paste and the like may be provided, although they are not described here.

(Export Module)

The export module M224 of FIG. 2 is a module which enables a sub-content to be copied by a drag & drop operation between the document processing module M2 and an external application, as described previously. Although it is not described, this module is available for the purpose of storing the sub-content dragged & dropped from the document processing module M2 in the format of an external application.

The word "export" used here denotes that a copy of sub-contents is transferred from the document processing module M2 to an external application.

In addition, the external application used here denotes an application other than the document processing system according to the present embodiment.

Figure 16:
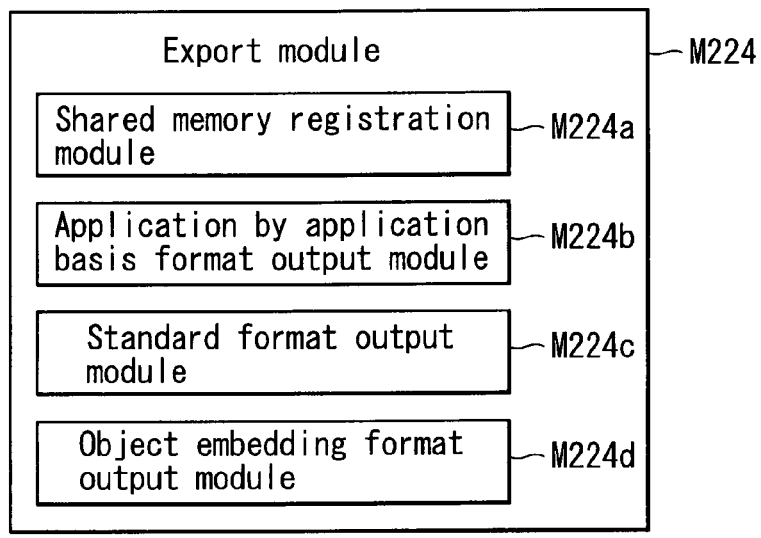
FIG. 16 is a diagram showing an example of functional configuration of an export module.

The export module M224 is composed of a plurality of sub-modules, as shown in FIG. 16. Although an export request whose page part is defined as an input is received from an external application, such a request is sent to a shared memory registration module M224a. The shared memory registration module M224a uses other output modules M224b to M224d to create export data which includes page parts targeted for processing for transferring the page parts and to register them in a shared memory which can be accessed from all the external applications. In this manner, when a page part is dropped, an external application can read the contents in the most preferable data format to the external application.

An application by application format output module M224b narrows a target to some prominent external applications, and converts a page part targeted for processing (at least display data displayed by the page part) into a data format applicable to these external applications, thereby generating the above export data and outputting the data to the external application.

A standard format output module M224c converts a page part targeted for processing (at least display data displayed by the page part) into a data format which is widely used such as a text format of an HTML format, thereby generating the above export data and outputting the data to an external application.

An object embedding format output module M224d outputs to the external application a page part targeted for processing (at least display data displayed by the page part) as in the data format (i.e., data format of page part D1, for example) of this system, together with reference information for associating with page part the document processing module M2 corresponding to the page part. In this method, the document processing module M2 is embedded partly of a window region of an external application being a drop destination.

(Page Parts Format Adjusting Module)

A page parts format adjusting module M225 of FIG. 2 is a module used in the page parts insertion processing module M221c, as described previously. Specifically, when the page parts insertion processing module M221c inputs a conversion request which includes page part targeted for conversion and the acceptance type D142 in another page part, the type name D11 of the page part targeted for conversion is searched. Then, at least a type (a data format, for example) of a partial document corresponding to a page part targeted for conversion is converted into any type included in the acceptance type D142 in another page part.

Figure 17:
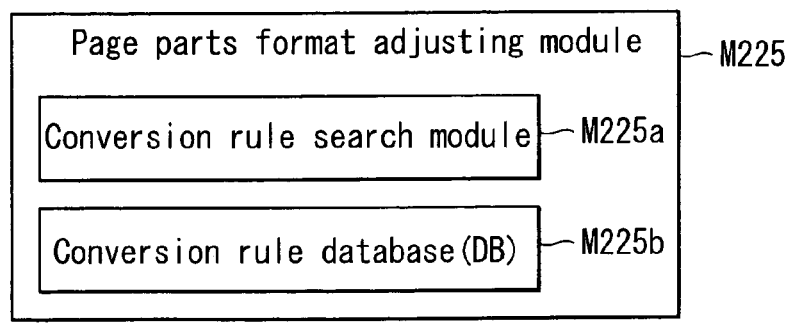
FIG. 17 is a diagram showing an example of functional configuration of a page parts format adjusting module.

This conversion request is sent from the page parts insertion processing module M221c (FIG. 19) to the conversion rule search module M225a as shown in FIG. 17.

In a conversion rule database M225b (FIG. 17), a plurality of conversion methods (conversion regulations or conversion rules) are stored in advance by type of conversion source and conversion destination.

The conversion rule search module M225a finds out a conversion method which corresponds to type of conversion source and conversion destination from the conversion rule database M225b, and returns the page part of the conversion result. If nothing is found out, this module returns the fact that the conversion has failed to the page parts insertion processing module M221c (FIG. 10) being a request source.

The conversion rule database M225b manages a plurality of data which contains a set of three items which are conversion source type, conversion destination type, and a conversion rule (a document describing a conversion regulation such as an XSLT document, for example). The conversion rule search module M225a (FIG. 17) searches a sequence path (a combination with its sequence) consisting of a plurality of conversion rules for conversion into any of the finally requested types, from the type name D11 of the inputted page part targeted for processing. When a plurality of sequences has been finally found, a combination of the shortest paths is adopted.

For example, assume that type of page part targeted for processing is a type "type-x", the final target type is a type "type-y" or a type "type-z", and the following data is stored in the conversion rule database M225b.

(type-x, type-a, xa. xsl)
(type-a, type-b, ab. xsl)
(type-b, type-y, by. xsl)
(type-x, type-c, xc. xsl)
(type-c, type-z, cz. xsl)

In this case, there are two types of sequences for conversion into a final target type; xa. xsl→ab. xsl→by. xsl and xc. xsl→cz. xsl. The conversion rule search module M225a selects the latter, and returns a page part (type "type-z") obtained as a result of applying XSLT documents in order.

(Desktop Pasting Module)

The desktop pasting module M3 is an application which operates in an independent process. When this application software drags & drops a page part (a sub-content) to a desktop, the application software incorporating the first host module M1 and the second host module M1 composed of a general browser, the page part can be pasted onto the desktop as in tag paper.

Conversely, the page part can be returned by dragging & dropping it from tag paper to the host module M1.

Figure 18:
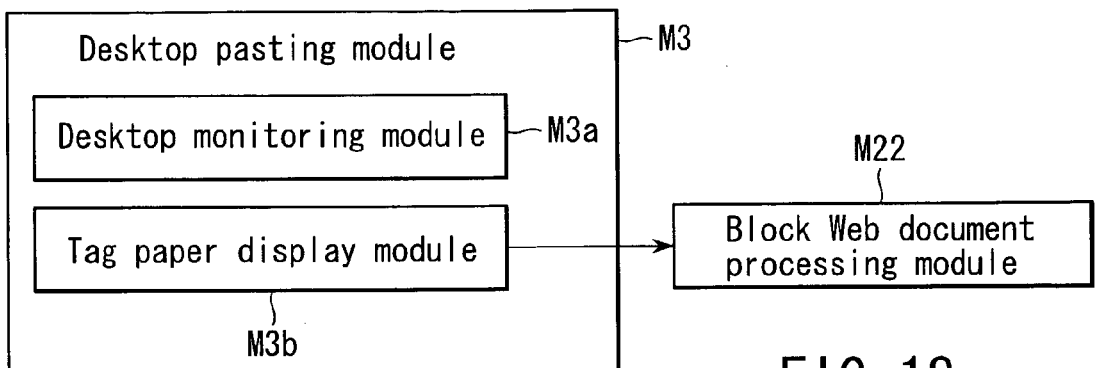
FIG. 18 is a diagram showing an example of functional configuration of a desktop pasting module.

The desktop pasting module M3 is composed of a desktop monitoring module M3a and a tag paper display module M3b, as shown in FIG. 18. The tag paper display module M3b is a module which is dynamically generated by the number of tag papers. In addition, each tag paper display module M3b generates and maintains the document processing module M22 at its inside.

Figure 19:
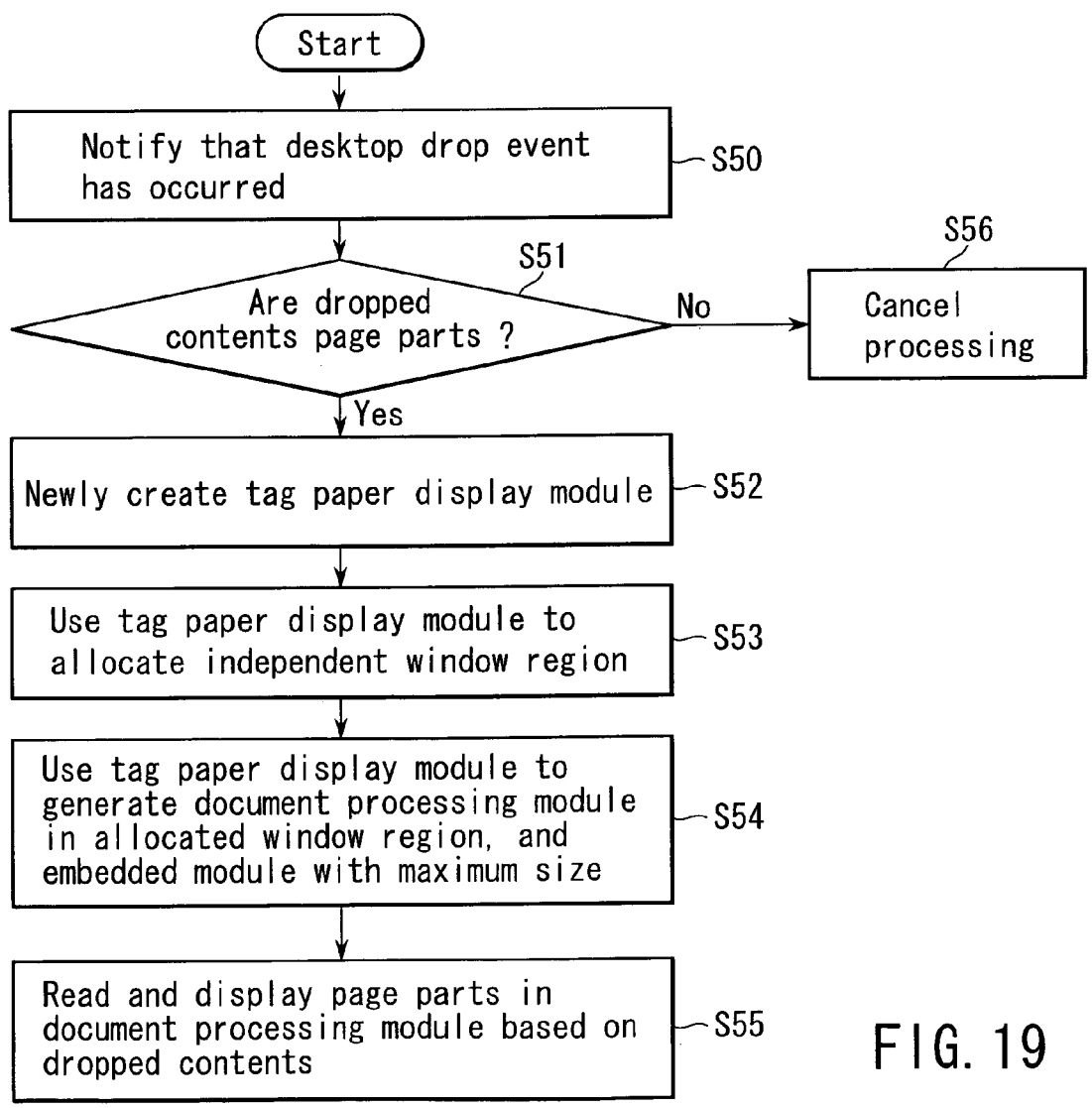
FIG. 19 is a flow chart illustrating an operation of the desktop pasting module.

In addition, FIG. 19 shows a flow of processing concerning a drop event for a desktop of a page part in the desktop pasting module M3.

In FIG. 19, for example, after a desired sub-content at the Web display portion 6-2 shown in FIG. 6 has been selected, when the desktop monitoring module M3a (FIG. 18) senses (step S50) that a drop event has occurred on a desktop after a drag operation, the tag paper display module M3b is initiated (step S51). At this time, when a sub-content (page part) is not selected, processing is canceled (step S56).

The initiated tag paper display module M3b (FIG. 18) allocates a window region on a screen and initiates the document processing module M2 (step S52 to step S54).

The tag paper display module Mb3 causes the initiated document processing module M3 to read the dropped sub-content (page part), and causes the window to display it (step S55).

In this manner, page parts can be pasted to tag papers one after another. Although not shown because it is publicly known, the window created by each tag paper display module can be moved anywhere the user likes on a screen later.

Conversely, the page part displayed as a tag paper is dragged & dropped on a browser, whereby the page part can be added to a page displayed by the browser or can be deleted from the page.

These functions are not specifically provided by the desktop pasting module M3, and is carried out by the document processing module M22 in each tag paper display module M3b which has been described previously in detail.

(Summary of Document Editing System)

As has been described above, a document editing system according to the present embodiment comprises:

displaying on display means (corresponding to an output device 24 of FIG. 24) a structured document having a document structure composed of a plurality of elements;

editing a structured document based on a partial document coincident with or included in the structured document, the partial document composed of at least one element for displaying display data defined as an operating unit in advance on the display means;

creating parts data (i.e., page parts) by partial document which includes position information on at least the partial document (which includes information representing a parent-child relationship (an inclusive relationship) between partial documents) based on information (for example, an attribute "component") contained in a partial document, the information representing a partial document which corresponds to at least one sub-content;

storing in storage means (i.e., page part database) the structured document as a set of parts data; and updating the parts data corresponding to the display data targeted for operation according to the contents of operation for the display data selected as an operating target, of the display data displayed on the display means, thereby editing the structured document.

Each partial document contains as additional information on the partial document (such as attribute information, for example):

a type of the partial document;

at least one conversion rule for converting a data format of the partial document in another data format;

link information for a partial document in another structured document displayed on the display unit as the partial document; and at least one of a type and an insertion position of another partial document which can be inserted into the partial document, the additional information being included in the parts data. Such additional information is extracted from each partial document, and parts data on the partial document is created. Therefore, parts data contains additional information contained in a partial document which corresponds to the parts data.

For example, a position of a partial document can be represented as a location on a document structure of another partial document such as Web page, for example, which includes the partial document.

In addition, a relationship between a partial document corresponding to one entire Web page and a partial document corresponding to one sub-content contained in the Web page is considered to be a parent-child relationship (an inclusive relationship).

Also, there is a case where data (display data) displayed on display means in each partial document may be included in the partial document, and there is another case in which link information for the display data is contained in the partial document.

In this manner, according to the above described embodiment, the above described parts data (page parts) are created based on additional information relevant to each of partial documents which can be identified based on such information representing a partial document in units of operation, whereby, based on the parts data, the contents displayed on a screen can be easily operated to be edited in units of sub-contents (in units of partial documents).

(Service Server)

As has been described above, when a mechanism for carrying out operation or editing in units of sub-contents using a block Web document has been established, some of the Web page providers will want to increase the number of browsers on the Web page by utilizing this mechanism to improve the page inconvenience.

There are two application examples: a static Web page application example for the Web page provider to provide each portlet as a page part at a portal site; and a dynamic Web page application example of providing a product catalog of a search result as a page part at a shopping site or the like. That is, in the former case, all of the Web pages stored in a server are provided as a block Web document having block structure information or the like. In the latter case, for example, each record is provided as one sub-content (a page part); a plurality of records obtained as a result of search are collected in a predetermined format; and one block Web document is created so as to be distributed to a client.

When the Web page provided from the Web site is the block Web document described previously, if the user browses the contents provided from the Web site via a browser, there is provided an advantageous effect that the above described operating function concerning the page parts contained in the Web page can be utilized.

Figure 23:
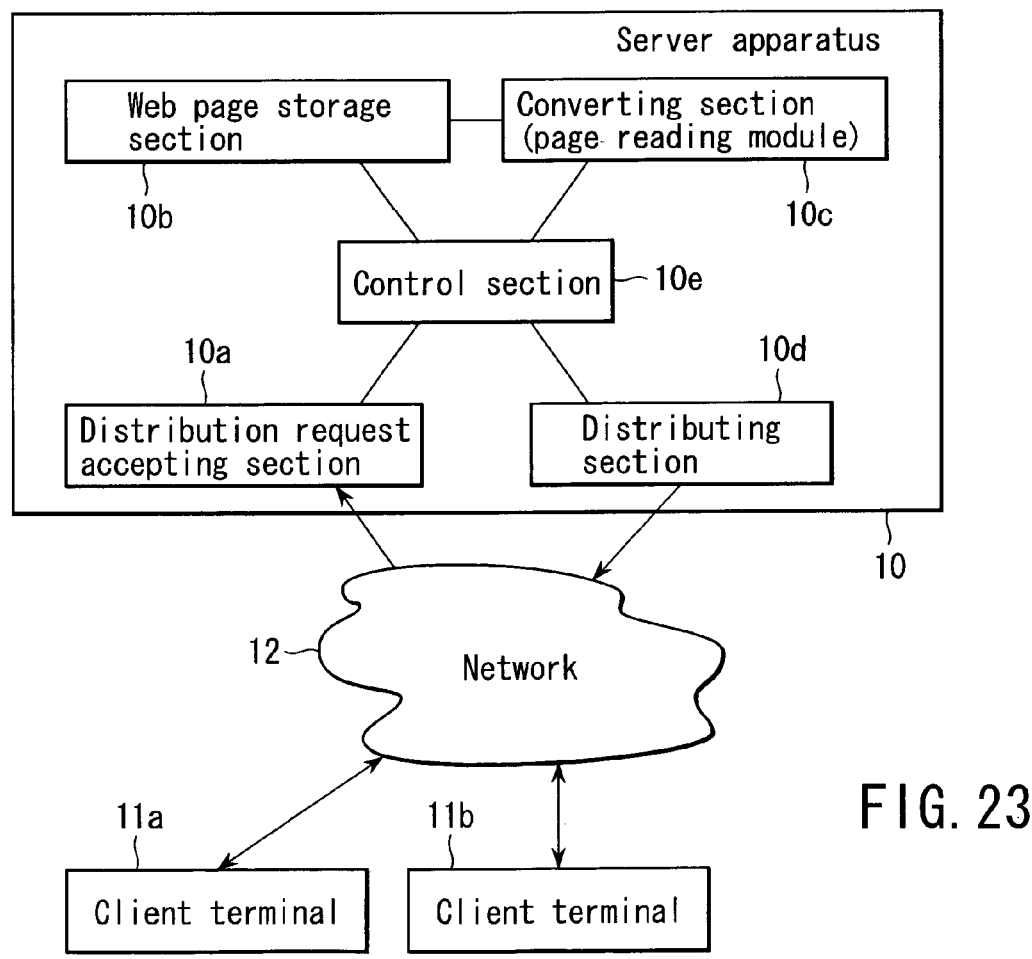
FIG. 23 is a diagram showing an example of configuration of a server apparatus.

FIG. 23 shows an example of configuration of a server apparatus. The server apparatus 10 is provided to accept a request from a plurality of client terminals (in this case, two terminals) 11a and 11b (hereinafter, each of these terminals is called client terminal 11 if there is no need to discriminate them) via a predetermined network 12 such as Internet, and distribute a desired Web document (Web page) to the user.

The server apparatus 10 shown in FIG. 23 comprises: a distribution request accepting section 10a which accepts a distribution request from the client terminal 11; a Web page storage section 10b which stores a plurality of Web pages (all of which may be a block Web document or may be a document other than the block Web document such as an HTML document); a converting section 10c for converting into a block Web document a Web document other than the block Web document; a distributing section 10d for distributing a Web page requested for distribution to the client terminal 11 which is a request source; and a control section 10e for controlling each of the above sections.

Only the block Web document may be stored in the Web page storage section 10b, as described previously. In addition, a Web document other than a block Web document may be stored therein. A document other than the block Web document, of all the Web pages stored in the Web page storage section 10b (FIG. 23), is converted into a block Web document at the converting section 10c (FIG. 23).

The converting section 10c can be composed of the page reading module M21 described previously. That is, if there exists a conversion rule applicable to the Web documents stored in the Web page storage section 10b, such a document is converted into a block Web document by applying the conversion rule. When an applicable conversion rule does not exist, the Web document is construed as one page part; an attribute "component" is assigned to a root node of the Web document; and a default style is assigned to the Web document.

In this manner, based on a distribution request from the client terminal 11, the distribution request being accepted at the distribution request accepting section 10a, the block Web document requested from the client terminal 11 is distributed to a request source via the distributing section 10d.

In the meantime, another feature of this system is that the user can post page parts in excess of a Web site or Web page. Therefore, the user can sample only the page parts from the Web site for providing contents, and the user can continue an information browsing work on the basis of one's favorite Web site.

Therefore, Web sites can be discriminated from each other at a Web template region, i.e., at a margin portion where page parts are stored. In such discrimination, usability is improved by a design or function, thereby providing incentive to the client. In addition, advantageous effect can be achieved by carrying out guidance to one's owned service such as issuing banner advertisement or effectively outputting one's own products as a result of search.

A system configuration is provided such that a CGI for searching and outputting Web documents or page parts which include only a Web template region and a CGI for synthesizing and outputting the output result of a search CGI and a Web template region are disposed on the Web server.

Another service provided by the server include a service for the server to manage in a substitutive manner a scrap book prepared by a client (user) by using the document editing system shown in FIG. 24. Such a scrap book is stored on a user operating computer. Thus, there is an inconvenience that an access cannot be provided to the sub-contents stored in one's scrap book. A service for solving this problem include a solution for the server to manage a scrap book. In this case, the server authenticates a user; assigns a group of scrap books of the user so as to browse them; and provides a form for updating the scrap books.

In addition, the server can change the contents of scrap books displayed for the user so as to be convenient to one's own company. Thus, an advertisement effect can be attained by adding one's own product information to each of the scrap books, for example.

Alternatively, it becomes possible to ensure discrimination by a value added service that, from the contents of the sub-content described in a scrap book, the preference of each user or the like is analyzed by using the existing technique such as data mining; and information expected to be welcomed by the user is additionally described in each of the scrap books.

Now, a second embodiment of the present invention will be described here.

The term "tag paper or "tag" used in the following description is a tag paper (a tag) which is electronically created by a computer, and this is also called an electronic tag. In the present specification, the contents of electronic tag include an image, a video image, a voice and the like without being limited to a text. Further, the contents of electronic tag may be multimedia such as HTML having an image, a video image, a voice and the like in complex.

Hereinafter, a description will be given with respect to an electronic tag system which causes a computer having display means such as display to execute an arbitrary program, thereby carrying out a drag & drop operation between a document (data) displayed on the display means and a desktop to execute transfer to an electronic tag from a partial document (data) in a specified range or transfer from the electronic tag to a document (data) displayed on the display means.

Specifically, after a partial region of interest has been range-specified on document display software such as word processor software or Web (World Wide Web) browser, when the range-specified region is dropped on a desktop, a tag paper window having the contents of the partial document written therein is generated at the dropped position. On the other hand, after the tag paper generated on the desktop has been dragged while a shift key is pressed, for example (when dragging is carried out without pressing the shift key, the tag paper window is moved), when dropping is carried out for an arbitrary application handling a document, the contents of the document described on the tag paper are inserted into the document.

In this manner, it becomes possible to paste as tag paper a cut of the contents of the partial document maintained by the application on the desktop by a single-step GUI operation. Similarly, the contents of the document pasted as a tag paper can be inserted into a document of the application by a single-step GUI operation.

Now, a description will be given with respect to a case where the electronic tag according to the present embodiment is resided on an OS (Operating System) of a computer, for example, and is implemented as a program executed by the computer.

In the present embodiment, a description will be given by way of example of a drag & drop operation using a mouse as an operation for indicating a copy or move source and a copy or move destination. It should be noted that the present embodiment is not limited to this case.

Figure 25:
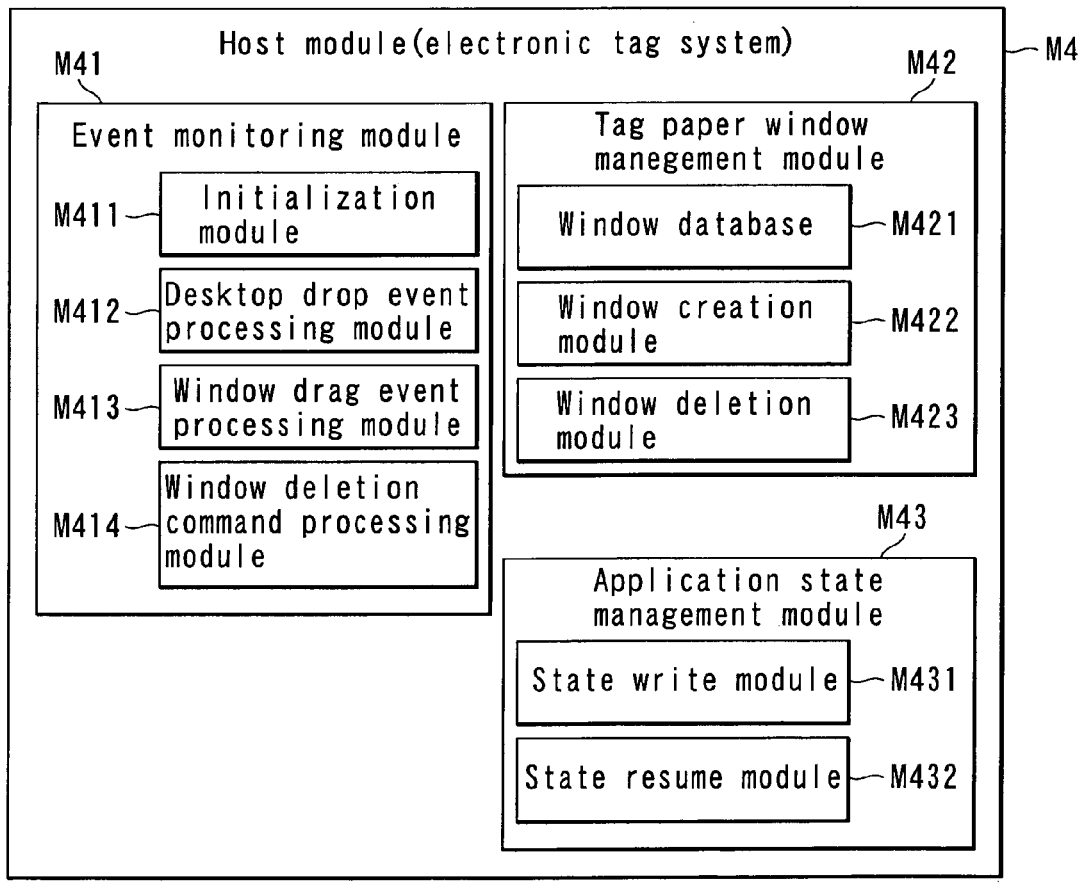
FIG. 25 is a diagram showing an example of functional configuration of an electrical tag system according to a second embodiment of the present invention.

FIG. 25 shows an example of functional configuration of an electronic tag system according to the present embodiment.

The electronic tag system incorporates a function for linking a document application for carrying out document creation/editing and the like with the desktop by a drag & drop operation; a function for deleting a generated tag paper window; and a function for, even if software is shut down, storing the immediately previous state when the software is initiated next.

The desktop used here denotes a basic screen displayed on display means, for carrying out file operation or application initiation on a computer (OS) having at least the display means.

Many of the conventional tag paper software components basically incorporate a function for changing a window position or size of a tag paper and an editor function for editing the contents of the tag paper, for example. These functions are categorized in the prior art, and thus, a description is omitted here.

As shown in FIG. 25, a host module M4 corresponding to the electronic tag system according to the present embodiment comprises: an event monitoring module M41; a tag window management module M42; and an application state management module M43.

The event monitoring module M41 is a module which monitors a desktop drop event and a tag paper window drag, and carries out processing required for posting a document application and a tag paper if an event occurs. In addition, this monitoring module monitors a menu command event for deleting a tag paper window.

The tag paper window management window M42 manages information on the tag paper window which the system maintains, and has a function for creating, displaying, and deleting the tag paper window.

The application state management module M43 is a module which may be called a serializer. This module provides a function for writing into a disk all of the state information which an application has; and a function for resuming an application from state information on the applications written into the disk.

Figure 30:
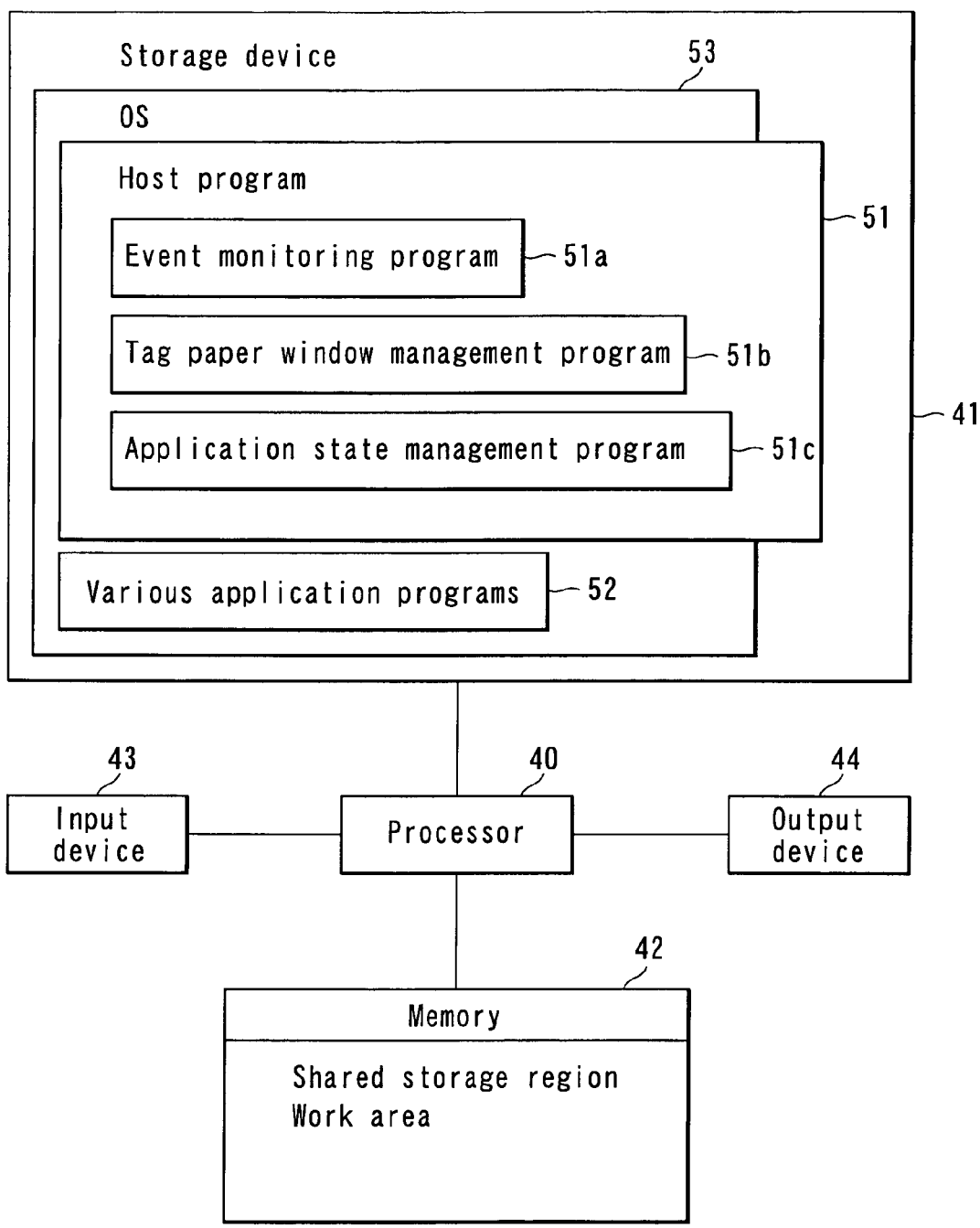
FIG. 30 is a diagram showing an example of configuration when the system shown in FIG. 25 is implemented on a computer (a computing machine), for example.

FIG. 30 shows an example of configuration in the case where the system shown in FIG. 25 is implemented on a computer (a computing machine), for example.

That is, in FIG. 30, this system is composed of a processor (CPU) 40, a memory 42, an output device 44 such as a display or a printer, an input device 43 such as a mouse or a keyboard, and a storage device 41.

Among them, the storage device 41 is utilized to store a program responsible for a nucleus of system controlling and to temporarily store data or the like. This storage device stores an OS 53, a host program 51, various application programs 52 and the like. In addition, the memory 42 is utilized for a shared storage region available for use in execution of each of the programs described above or for a working area during program execution. In addition, the program 40 executes the OS 53, for example, in the storage device 41, thereby implementing various required control processings including input/output control or various processings.

The processor 40 primarily provides an environment capable of initiating a program such as the host program 51 or various application programs 52 on a computer by initiating the OS 53 in the storage device 41.

In this state, the processor 40 provides a function which corresponds to the host module M4 of the system shown in FIG. 25 on the system shown in FIG. 30 by executing the host program 51 in the storage device 41 (that is, by initiating the host program 51 on the OS).

Further, the processor 40 provides a function which corresponds to each of these applications on the system shown in FIG. 30 by executing the various application programs 52 in the storage device 41 (that is, by initiating the various application programs 52 on the OS).

Now, a detailed description will be given below with respect to each sub-module in each module of FIG. 25.

The event monitoring module M41 is composed of: an initialization module M411; a desktop drop event module M412; a window drop event module M413; and a window deletion command processing module M414.

The initialization module M411 is a module which carries out initialization for link each sub-module which the event monitoring module M41 has with an event. This initialization module is called when an application is initialized and when a tag paper window is newly created.

The desktop drop event processing module M412 is a handler module which carries out processing when a desktop drop event occurs.

Figure 26:
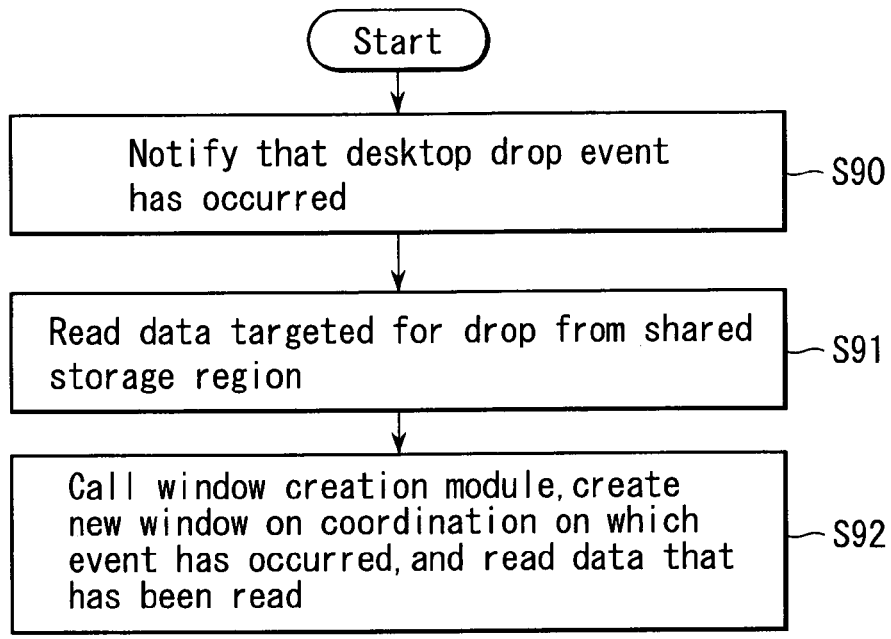
FIG. 26 is a flow chart illustrating a processing procedure when a drop event for a desktop has been sensed.

FIG. 26 is a flow chart illustrating a processing procedure for the desktop drop event processing module M412 (hereinafter, simply called a processing module M412).

For example, assume that part of the document displayed on a display by a document application is selected by a mouse or the like; the selected region is dragged; and a desktop is specified as a move destination by a drop operation. Here, assume that the data (information) contained in the above selected region is temporarily stored in a shared storage region in the memory 42 of FIG. 30 by a document application which displays the data.

The shared storage region designates a storage region which can be accessed from all applications. This region is called in WINDOWS (trademark), for example.

In a general application on Windows, when a drag operation is made by using a mouse in a state in which a region is selected, it is general that the contents in the selected region are stored in the shared storage region (a clipboard).

When the occurrence of the drop event for the desktop is sensed (step S90), the processing module M412 reads data targeted for drop from the shared storage region (step S91).

At this time, the data format of the data written in the shared storage region may be any of the HTML format, rich text format, text format and the like. In this case, the processing module M412 selects any one of the above formats in accordance with the priority assigned to this system in advance, and converts the data read out from the shared storage region into the selected data format.

Next, a window creation module M422 is called; a window is newly created on the coordinate on which a drop event has occurred; and data read in the window is written (step S92).

The window drag event processing module M413 (hereinafter, simply called a processing module M413) is a handler module which carries out processing when there occurs an event that a tag paper window has been dragged.

Figure 27:
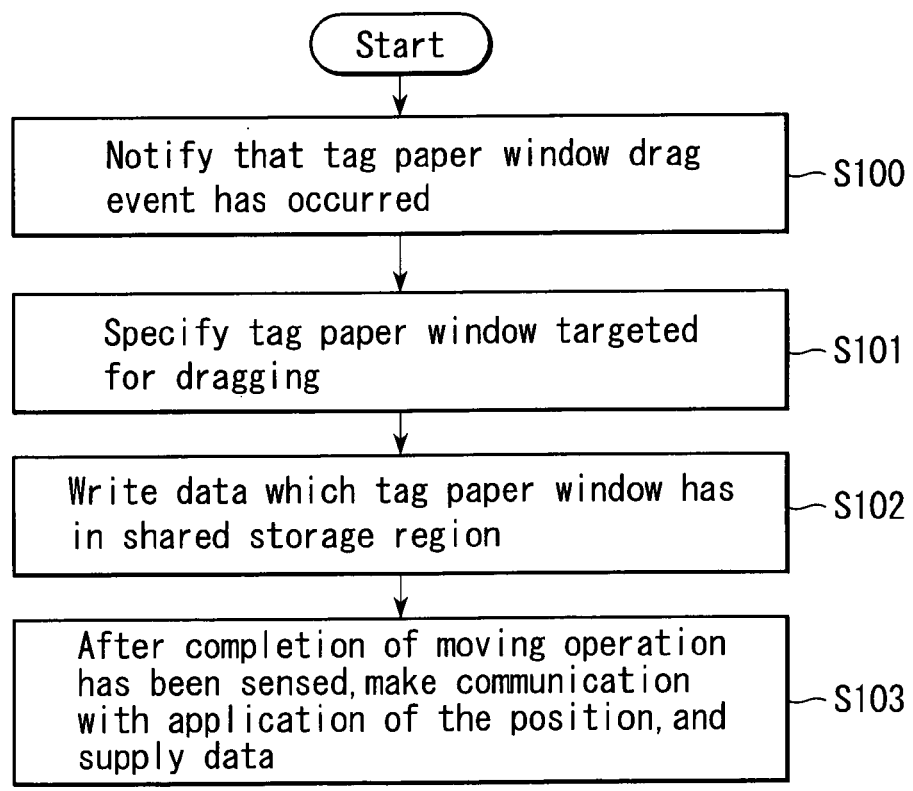
FIG. 27 is a flow chart illustrating a processing procedure when a drag event for a tag paper window has been sensed.

FIG. 27 is a flow chart illustrating a processing procedure of the processing module M413.

For example, when the fact (a drag event) that the tag paper window displayed on a display is operated to be dragged (a drag event) is sensed (step S100), the tag paper window targeted for dragging is specified (step S101) from among the tag paper window stored in a window database M421. This window can be specified by comparing a position of a display region on a tag paper window specified as a drag target or identification information on the tag paper window with information concerning each tag paper window stored in the window database M421. The existing technique may be used without being limited to this case.

The data pasted on the specified tag paper window is written into the shard storage region of the memory 42 of FIG. 30, for example (step S102).

The shared storage region is a memory region which can be accessed even when executing any of the applications stored in a computer.

Subsequently, when it is sensed that a moving operation has completed when the mouse button is released, communication with an application existing on the front-most face on the coordination (an application for displaying a document specified as a copy or move destination by a drop operation) is made, and the data written in the shared storage region is supplied (step S103). That is, the data written in the shared storage is read by a computer which executes the application program existing on the front-most face on the coordinate.

Some OSs search an application which should be a communication partner at the same time when a mouse button is released, and provide a channel for data transfer between both of them. Therefore, in this case, the software may only supply data to a channel assigned by the OS.

In addition, some OSs automatically carries out data transfer itself. In this case, processing in step S103 is not required, and processing for writing data in the above shared storage region, the data having been written in an electronic tag, will suffice.

The window deletion command processing module M414 (hereinafter, simply called a processing module M414) is a handler module initiated when the deletion menu provided by each tag paper window has been selected by the user.

When the processing module M414 is initiated, a window deletion module M423 is called while reference information for a tag paper window targeted for deletion is defined as an argument.

The reference information for the tag paper window may be an address on the window database M421 having stored therein the information concerning the tag paper window. In addition, when identification information for identifying each of the tag paper windows during creation of the window is provided, this identification information may be used as the above reference information. Any reference information may be used as long as there is provided information capable of recognizing which of the tag paper windows is specified in this system.

The tag paper window management module M42 is composed of the window database M421, the window creation module M422, and the window deletion module M423.

The window database M421 stores information concerning each tag paper window as a list in order to manage the tag paper window maintained by this system.

The information concerning the tag paper window contains, for example, data stored as tag paper, coordinate indicating the display position of the tag paper window or window size, identification information provided to each tag paper window and the like.

The window creation module M422 is a module called by the processing module M412. This module receives as parameters the coordinate indicating the position for creating a window and the data stored in the window, and displays the window on a screen.

Figure 28:
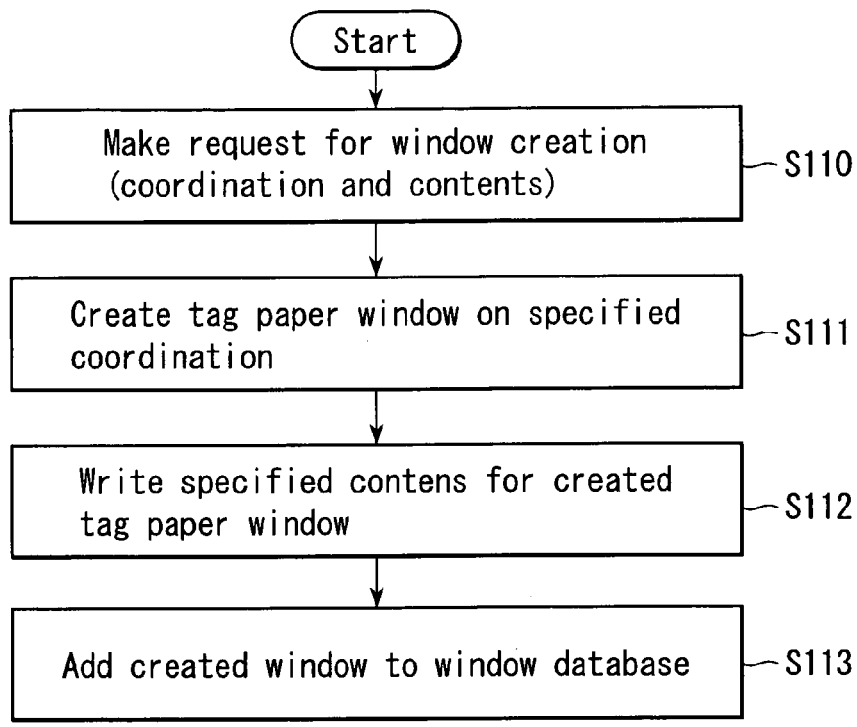
FIG. 28 is a flow chart illustrating a processing procedure for creating the tag paper window.

FIG. 28 is a flow chart illustrating a processing procedure of the window creation module M422.

When this creation module receives from the processing module M412 a window creation request including the coordinate indicating the position for creating a window and the data stored in the window (step S110), it creates the tag paper window on the specified coordinate (step S111). The module writes the above data contained in the window creation request in the created tag paper window (step S112), and stores the information concerning the newly created window in the window database M421 (step S113).

Every time the tag paper window is created, the window creation module M422 may store identification information for identifying each of the windows in the window database M421 by providing the information.

The window deletion module M423 is a module called by the processing module M414. This module receives as a parameter the reference information for a tag paper window targeted for deletion, and deletes the tag paper window.

Figure 29:
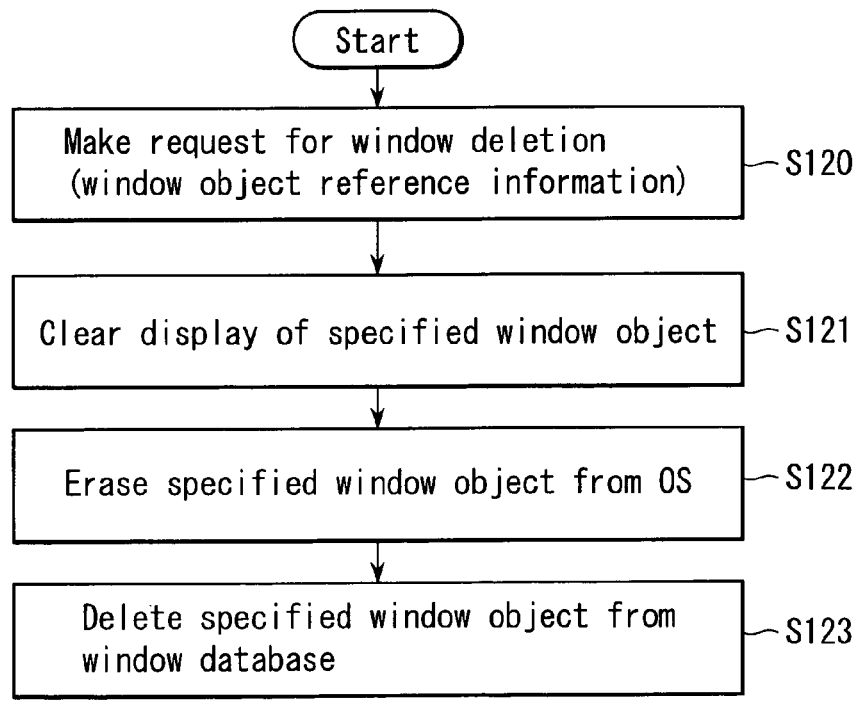
FIG. 29 is a flow chart illustrating a processing procedure for deleting the tag paper window.

FIG. 29 is a flow chart illustrating a processing procedure for the window deletion module M423.

When this module receives from the processing module M414 a window deletion request including reference information on a tag paper window targeted for deletion (step S120), it erases display of the tag paper window specified based on the reference information (step S121) and erases it from the OS (step S122). Further, the deletion module erased from the window database M121 the information concerning the specified tag paper window (step S123).

Now, a description will be given with respect to the application state management module M43.

The application state management module M43 is composed of a state write module M431 and a state resume module M432.

The state write module M431 is a module called when the various application programs 52 such as a document application have been executed. This write module writes all of the information maintained by the application into a disk or the like. At this time, the information written into the disk is called application state information.

In this system, the state write module M431 processes window information such as coordinate or size and data stored as a tag paper, for example, relevant to each of the tag paper windows registered in the window database M421.

The state write module M431 writes these items of information into a disk in order of being stored in the window database M421.

The state resume module M432 is a module called when the various application programs 52 such as a document application are started to be executed. This module carries out reading and state restoration in an application based on the application state information written in the disk. This operation is reversed from the state write module M431.

As has been described above, according to the above described embodiment, a first program is executed on a computer having at least display means, whereby it is sensed that a desktop displayed on display means is specified as a copy or move destination by a copy or move operation for second data which is the data in a specified range, of the first data displayed on display means (for example, it is sensed that a desktop is specified by a drop operation), a window being an electronic tag (a tag paper window) is displayed at a specified position as the copy or move destination on the desktop, and the second data stored in the shared storage region in the computer is displayed on this window.

That is, according to the above described embodiment, for example, the above second data can be pasted to an electronic tag (a tag paper window) by a single-step GUI operation via a drag & drop.

In addition, when a moving operation (for example, a drag operation) for moving a display position of a tag paper window is sensed, in order to insert the second data displayed in the tag paper window displayed on display means into third data displayed on display means by executing a second program which is different from the first program on the above computer, the second data displayed in the tag paper window is stored in the above shared storage region.

The second data stored in this shared storage region is read by a function of the second program through an operation (for example, a drop operation) for specifying a desired position of the third data as a move destination, and is inserted into the third data.

That is, according to the above described embodiment, for example, via a drag & drop, the second data pasted onto tag paper can be inserted into a desired position in the third data by a single-step GUI operation.

As a program which can be executed by a computer, a technique described in the embodiments of the present invention can be stored in a recording medium such as a magnetic disk (such as a floppy disk or a hard disk), an optical disk (such as CD-ROM or DVD), or a semiconductor memory, or can be distributed via a network such as Internet.

The present invention is not limited to the above described embodiments, and various modifications can occur without departing from the spirit of the invention at an implementation stage. Further, the inventions at a variety of stages are included in the above described embodiments, and a variety of inventions can be excerpted according to a proper combination in a plurality of disclosed constituent elements. For example, even if some of the all the constituent elements presented in the embodiments are deleted, when (at least one of) the problems described in the Brief Summary of the Invention section can be solved and when (at least one of) the advantageous effects described in the Advantageous Effect of the Invention section can be obtained, the configuration from which this constituent element has been deleted can be excerpted as an invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A document editing method in a document editing system for editing a plurality of structured documents each having a document structure including a plurality of elements, the method comprising steps of:

reading a first structured document;

determining type information associated with the read first structured document and determining whether the first structured document is a block document, that includes tag information for specifying partial documents that correspond to operation units on which a selected operation may be performed, and each operation unit including at least a portion of the first structured document;

converting the first structured document into the block document when the first structured document is determined not to be the block document, said converting includes (a) inserting the tag information into the first structured document based on a block conversion rule to obtain partial documents corresponding to the operation units, or (b) inserting the tag information into the first structured document according to an existing structure of the first structured document to obtain partial documents corresponding to the operation units;

displaying the first structured document determined as the block document or the first structured document converted into the block document on a display;

preparing parts data associated with the first structured document for each of the partial documents based on the tag information included in the first structured document, said parts data including at least the partial documents included in the first structured document and position information representing a location within the first structured document of each partial document;

storing the first structured document in a storage as a collection of the parts data; and editing the first structured document by updating the parts data corresponding to the partial documents in accordance with the selected operation.

2. The method of claim 1, wherein the preparing further comprises preparing parts data for each partial document, the parts data of a corresponding partial document including:

a type of the corresponding partial document;

at least one conversion rule configured to convert a data format of the corresponding partial document into another data format;

link information inserted in the corresponding partial document and linking to another partial document of the first structured document; and at least one of a type and an insertion position of a different partial document that can be inserted into the corresponding partial document.

3. The method according to claim 2, wherein the parts data of the corresponding partial document includes at least one conversion rule, and the method further comprising:

switching a display format of the partial document based on one of the conversion rules.

4. The method of claim 1, wherein said editing changing the position information in the parts data of a corresponding partial document when a position on the document structure of the corresponding partial document is moved.

5. The method of claim 1, further comprising:

displaying a second structured document, which is the block document, on the display;

changing position information in first parts data for a first partial document in the first structured document when the first partial document is inserted into a specified position of the second structured document;

obtaining second parts data for the second structured document; and storing the second parts data in the storage.

6. The method of claim 1, further comprising:

displaying a second structured document, which is the block document, on the display, creating new parts data as parts data for a second structured document when a first partial document included in the first structured document is inserted into a specified position of the second structured document, the new parts data including link information for associating the specified position in the second structured document with a parts document corresponding to the first partial document; and storing the created new data in the storage.

7. The method of claim 1, further comprising:

displaying a second structured document, which is the block document, on the display, determining whether a first partial document in the first structured document can be inserted into a second partial document in a second structured document based on a type of the first partial document contained in first parts data corresponding to the first partial document and a type of another partial document that can be inserted into the second partial document contained in second parts data corresponding to the second partial document when the first partial document is requested to be inserted in the second partial document;

obtaining third parts data by changing position information in the first parts data based on an insertion position in the second structured document and storing the third parts data in the storage as parts data on the second structured document when the determining determines that the first partial document can be inserted into the second partial document; and converting a data format of the first partial document contained in the first parts data into a data format that can be inserted into the second partial document, changing position information contained in the first parts data in association with an insertion position in the second structured document to create new parts data, and storing the new parts data in the storage as parts data of the second structured document when the determining determines that the first partial document cannot be inserted in the second partial document.

8. The method of claim 1, wherein the editing step includes a parts insertion step in which:

when the first partial document of the first structured document displayed on the display is inserted in the second partial document included in the first structured document, (a) converting the data format of the first partial document that cannot be inserted into the second partial document into a data format that can be inserted into the second partial document, (b) changing position information contained in parts data corresponding to the first partial document in association with an insertion position in the second partial document, storing in the storage new parts data obtained as a result of the changing as parts data of the second partial document, and deleting from the storage parts data corresponding to the first partial document.

9. The method according to claim 1, further comprising:

deleting from the storage parts data corresponding to the partial document and parts data corresponding to a contained partial document contained in the partial document when the partial document is deleted.

10. The method according to claim 1, further comprising:

updating the partial document contained in parts data corresponding to the partial document when contents of the partial document are edited.

11. The method according to claim 1, further comprising:

creating and storing in the storage the parts data including at least a new partial document and position information corresponding to an insertion position where the new partial document is inserted on the first document structure when the new partial document is inserted in the first structured document displayed on the display.

12. The method according to claim 1, further comprising:
extracting a partial document in a range specified by a user from among partial documents displayed on the display unit;
creating new parts data corresponding to the extracted partial document; and
storing the created new parts data in the storage.

13. The method of claim 1, further comprising:
retrieving the block conversion rule based on a storage location of the first structured document.

14. The method of claim 1, wherein the tag information includes information representing a parent-child relationship between partial documents.

15. A document editing system for editing a selected structured document, the selected structured document being one of a plurality of structured documents, each of the structured documents having a document structure made up of a plurality of elements, said document editing system comprising:
a reading unit configured to read the selected structured document;
a determining unit configured to determine a type information associated with the read structured document and configured to determine whether the selected structured document is a block document that includes tag information for specifying partial documents that correspond to operation units on which a selected operation may be performed, and each operation unit including at least a portion of the selected structured document;
a converting unit configured to convert the first structured document into the block document when the selected structured document is determined not to be the block document, and configured to
(a) insert the tag information into the first structured document based on a block conversion rule to obtain partial documents corresponding to the operation units, or
(b) insert the tag information into the first structured document according to an existing structure of the first structured document to obtain partial documents corresponding to the operation units;
a display unit configured to display the structured document determined as the block document or converted into the block document;
a preparing unit configured to prepare parts data associated with the selected structured document for each of the partial documents based on the tag information included in the selected structured document, said parts data including at least the partial documents included in the selected structured document and position information representing a location within the selected structured document of each partial document;
a storage unit configured to store the structured document as a collection of the parts data; and
an editing unit configured to edit the selected structured document by updating the parts data corresponding to the partial documents in accordance with the selected operation.

16. The system according to claim 15, wherein parts data for a corresponding partial document includes:
a type of the corresponding partial document;
at least one conversion rule for converting a data format of the corresponding partial document into another data format;
link information inserted in the corresponding partial document and linking to another partial document of the structured document; and
at least one of a type and an insertion position of another partial document that can be inserted into the corresponding partial document.

17. The system according to claim 16, wherein the parts data corresponding to the partial document includes at least one conversion rule, and the editing unit includes a display switching unit configured to switch a display format of the partial document by using one of the conversion rules.

18. The system according to claim 15, further comprising:
a changing unit configured to change position information contained in parts data corresponding to the partial document in association with a position of a move destination.

19. The system according to claim 15, wherein the display unit is further configured to display a first structured document and a second structured document, and
wherein the editing unit includes a parts insertion unit configured to change position information contained in first parts data corresponding to parts data representing a first partial document in association with specified position in the second structured document, and configured to cause the storage unit to store second parts data obtained as a result of a change in the storage unit as parts data on the second structured document when the first partial document included in the first structured document is inserted into the specified position of the second structured document.

20. The system according to claim 15, wherein the display unit is further configured to display a first structured document and a second structured document, and
wherein the editing unit includes a parts insertion unit configured to create new parts data, the new parts data including link information for associating a specified position in a second structured document with a parts document corresponding to a first partial document included in the first structured document, and configured to cause the storage unit to store the created new data as parts data on the second structured document when the first partial document is inserted into the specified position of the second structured document.

21. The system according to claim 15, wherein the display unit is further configured to display a first structured document and a second structured document, and
wherein the editing unit includes a parts insertion unit configured to
(a) determine whether a first partial document in the first structured document can be inserted into a second partial document based on a type of the first partial document contained in first parts data and a type of another partial document that can be inserted into the second partial document contained in second parts data, which is the parts data corresponding to the second partial document when the first partial document is inserted into a second parts document included in the second structured document, and
(b) cause the storage unit to store third parts data obtained as a result of a change in the storage unit as parts data on the second structured document when the first partial document can be inserted into the second partial document, and (c) convert a data format of the first partial document contained in the first parts data into a data format that can be inserted into the second partial document, change position information contained in the first parts data in association with an insertion position in the second structured document, and cause the storage unit to store new parts data obtained as a result of the change in the storage unit as parts data of the second structured document when the first partial document cannot be inserted.

22. The system according to claim 15, wherein the editing unit is further configured to delete from the storage unit a selected partial document by deleting parts data corresponding to the selected partial document and by deleting parts data corresponding to a partial document contained in the selected partial document.

23. The system according to claim 15, wherein the editing unit includes a parts editing unit configured to update a partial document contained in parts data corresponding to a partial document when contents of the partial document are edited.

24. The system according to claim 15, wherein the editing unit includes a parts adding unit configured to create parts data including at least a new partial document and position information corresponding to an insertion position where the new partial document is inserted on the selected structured document, and configured to cause the storage means to store the parts data when the new partial document is inserted in the selected structured document displayed on the display unit.

25. The system according to claim 15, wherein the editing unit includes a parts creation configured to extract a partial document in a range specified by a user from among partial documents displayed on the display unit, configured to create new parts data corresponding to the extracted partial document, and configured to cause the storage unit to store the created new parts data.

26. The system according to claim 15, wherein the block documents of said plurality of structured documents are distributed from a server apparatus.

27. A document editing system according to claim 26, wherein the structured documents distributed from the server apparatus include tag information specifying the partial documents included therein, and the partial document further includes, as additional information of the partial document:
 a type of the partial document;
 at least one conversion rule for converting a data format of the partial document into another data format;
 link information inserted in the partial document and linking to another partial document of the structured document; and
 at least one of a type and an insertion position of another partial document that can be inserted into the partial document.

28. The system of claim 15, further comprising:
 retrieving the block conversion rule based on a storage location of the first structured document.

29. The system of claim 15, wherein the tag information includes information representing a parent-child relationship between partial documents.

30. A document processing computer program product including a computer program for editing a structured document, the structured document being one of a plurality of structured documents and having a document structure made up of a plurality of elements, said document editing program causing the computer to perform steps comprising:
 reading a first structured document included among said plurality of structured documents;
 determining type information associated with the read structured document and determining whether the structured document is a block document that includes tag information for specifying partial documents that correspond to operation unit on which a selected operation may be performed, and each operation unit including at least a portion of the first structured document;
 converting the first structured document into the block document when the structured document is determined not to be the block document, said converting includes
 (a) inserting the tag information into the first structured document based on a block conversion rule to obtain partial documents corresponding to the operation units, or
 (b) inserting the tag information into the first structured document according to an existing structure of the first structured document to obtain partial documents corresponding to the operation units;
 display, displaying the first structured document determined as the block document or converted into the block document;
 preparing parts data associated with the first structured document for each of the partial documents based on the tag information included in the structured document, said parts data including at least the partial documents and position information representing a location within the first structured document of each partial document;
 storing the first structured document as a collection of the parts data; and
 editing the structured document by updating the parts data corresponding to the partial documents in accordance with the selected operation.

31. The computer program product of claim 30, further comprising:
 retrieving the block conversion rule based on a storage location of the first structured document.

32. The computer program product of claim 30, wherein the tag information includes information representing a parent-child relationship between partial documents.

* * * * *